(12) United States Patent
Lee et al.

(10) Patent No.: US 7,588,717 B2
(45) Date of Patent: Sep. 15, 2009

(54) APPARATUS FOR MANUFACTURING COMPACTED IRONS OF REDUCED MATERIALS COMPRISING FINE DIRECT REDUCED IRONS AND APPARATUS FOR MANUFACTURING MOLTEN IRONS USING THE SAME

(75) Inventors: Kwang-Hee Lee, Pohang (KR); Sung-Kee Shin, Pohang (KR); Il-Hyun Cho, Pohang (KR); Do-Seung Kim, Pohang (KR); Hyun-Uck Sung, Pohang (KR); Deuk-Chae Kim, Pohang (KR); Byung-Sik Ahn, Pohang (KR); Kyu-Cheol Ahn, Pohang (KR); Myung-Ho Cho, Pohang (KR); Myung-Chan Shin, Pohang (KR)

(73) Assignee: POSCO, Pohang-shi, Kyungsangbuk-do (KR)

( * ) Notice: Subject to any disclaimer, the term of this patent is extended or adjusted under 35 U.S.C. 154(b) by 211 days.

(21) Appl. No.: 11/571,966

(22) PCT Filed: Jul. 12, 2005

(86) PCT No.: PCT/KR2005/002241

§ 371 (c)(1),
(2), (4) Date: Jan. 11, 2007

(87) PCT Pub. No.: WO2006/006820

PCT Pub. Date: Jan. 19, 2006

(65) Prior Publication Data

US 2007/0235909 A1    Oct. 11, 2007

(30) Foreign Application Priority Data

| Jul. 12, 2004 | (KR) | ............ 10-2004-0053895 |
| Jul. 12, 2004 | (KR) | ............ 10-2004-0053896 |
| Jul. 16, 2004 | (KR) | ............ 10-2004-0055555 |
| Jul. 16, 2004 | (KR) | ............ 10-2004-0055558 |
| Jul. 30, 2004 | (KR) | ............ 10-2004-0060124 |
| Jul. 11, 2005 | (KR) | ............ 10-2005-0062161 |
| Jul. 11, 2005 | (KR) | ............ 10-2005-0062163 |

(51) Int. Cl.
C22B 1/24 (2006.01)

(52) U.S. Cl. ............ 266/176; 75/746; 100/907; 419/69

(58) Field of Classification Search ............ 266/176, 266/177; 75/436, 746; 222/138, 145; 100/907; 419/69; 425/237
See application file for complete search history.

(56) References Cited

U.S. PATENT DOCUMENTS 3,269,611 A * 8/1966 Komarek ............ 222/190

(Continued)

FOREIGN PATENT DOCUMENTS

JP        59-133334 A        7/1984

(Continued)

Primary Examiner—Melvin C Mayes
Assistant Examiner—James Corno
(74) Attorney, Agent, or Firm—Lexyoume IP Group, LLC.

(57) ABSTRACT

The present invention relates to an apparatus for manufacturing compacted irons and an apparatus for manufacturing molten irons using the same. The apparatus for manufacturing compacted irons according to the present invention includes a charging hopper into which reduced materials containing fine reduced irons are charged, screw feeders installed inside the charging hopper to make an acute angle with a vertical direction and discharging the reduced materials containing fine reduced irons which enter into the charging hopper, and a couple of rolls separated from each other to form a gap between the rolls. The couple of rolls compact the reduced materials containing fine reduced irons discharged from the charging hopper by the screw feeders and manufacture compacted irons. Each screw feeders is arranged side by side along an axis direction of the couple of rolls and an extension of the center axis of each screw feeder passes through the gap.

63 Claims, 16 Drawing Sheets

U.S. PATENT DOCUMENTS

| | | | |
|---|---|---|---|
| 4,076,520 A | | 2/1978 | Pietsch |
| 4,398,876 A | | 8/1983 | Ohtawa et al. |
| 5,547,357 A | * | 8/1996 | Bergendahl .................. 425/79 |
| 5,666,638 A | | 9/1997 | Bergendahl |

FOREIGN PATENT DOCUMENTS

| | | |
|---|---|---|
| JP | 59-170212 | 9/1984 |
| JP | 01-252714 | 10/1989 |
| JP | 05-009526 | 1/1993 |
| JP | 06-316718 | 11/1994 |
| RU | 1831367 | 7/1997 |
| SU | 658054 | 4/1979 |
| SU | 831829 | 5/1981 |
| WO | 03/056039 A | 7/2003 |
| WO | 2004057042 | 7/2004 |
| WO | WO 2004057042 A1 * | 7/2004 |

* cited by examiner

APPARATUS FOR MANUFACTURING COMPACTED IRONS OF REDUCED MATERIALS COMPRISING FINE DIRECT REDUCED IRONS AND APPARATUS FOR MANUFACTURING MOLTEN IRONS USING THE SAME

BACKGROUND OF THE INVENTION

1. Field of the Invention

The present invention relates to an apparatus for manufacturing compacted irons and an apparatus for manufacturing molten irons using the same, and more particularly, to an apparatus for manufacturing compacted irons by compacting reduced materials comprising fine direct reduced irons and manufacturing compacted irons and an apparatus for manufacturing molten irons using the same.

2. Description of the Related Art

The iron and steel industry is a core industry that supplies the basic materials needed in construction and in the manufacture of automobiles, ships, home appliances, etc. Further, it is an industry which has the longest history having advanced since the dawn of human history. Iron works, which play a pivotal roll in the iron and steel industry, produce steel from molten iron, and then supply it to customers, after first producing the molten iron (i.e., pig iron in a molten state) using iron ores and coals as raw materials.

Nowadays, approximately 60% of the world's iron production is produced using a blast furnace method that has been developed since the 14th century. According to the blast furnace method, irons ores, which have gone through a sintering process, and cokes, which are produced using bituminous coals as raw materials, are charged into a blast furnace together and oxygen is supplied to the blast furnace to reduce the iron ores to irons, thereby manufacturing molten irons. The blast furnace method, which is the most popular in plants for manufacturing molten irons, requires that raw materials have strength of at least a predetermined level and have grain sizes that can ensure permeability in the furnace, taking into account reaction characteristics. For that reason, cokes that are obtained by processing specific raw coals are needed as carbon sources to be used as fuel and as a reducing agent. Also, sintered ores that have gone through a successive agglomerating process are needed as iron sources. Accordingly, the modern blast furnace method requires raw material preliminary processing equipment, such as coke manufacturing equipment and sintering equipment. Namely, it is necessary to be equipped with subsidiary facilities in addition to the blast furnace, and also with equipment for preventing and minimizing pollution generated by the subsidiary facilities. Therefore, the heavy investment needed for the additional facilities and equipment leads to increased manufacturing costs.

In order to solve these problems with the blast furnace method, significant effort is made in iron works all over the world to develop a smelting reduction process that produces molten irons by directly using fine coals as fuel and as a reducing agent and by directly using fine ores, which account for more than 80% of the world's ore production.

An installation for manufacturing molten irons directly using raw coals and fine iron ores is disclosed in U.S. Pat. No. 5,534,046. The apparatus for manufacturing molten irons disclosed in U.S. Pat. No. 5,534,046 includes three-stage fluidized-bed reactors forming a bubbling fluidized bed therein and a melter-gasifier connected thereto. The fine iron ores and additives at room temperature are charged into the first fluidized-bed reactor and successively go through three-stage fluidized-bed reactors. Since hot reducing gas produced from the melter-gasifier is supplied to the three-stage fluidized-bed reactors, the temperature of the iron ores and additives is raised by contact with the hot reducing gas. Simultaneously, 90% or more of the iron ores and additives are reduced and 30% or more of them are sintered, and they are charged into the melter-gasifier.

A coal packed bed is formed in the melter-gasifier by supplying coals thereto. Therefore, iron ores and additives are melted and slagged in the coal packed bed and then are discharged as molten irons and slags. The oxygen supplied from a plurality of tuyeres installed on the outer wall of the melter-gasifier burns a coal packed bed and is converted to a hot reducing gas. Then, the hot reducing gas is supplied to the fluidized-bed reactors in order to reduce iron ores and additives and is exhausted outside.

However, since a high-speed gas flow is formed in the upper portion of the melter-gasifier included in the above-mentioned apparatus for manufacturing molten irons, there is a problem in that the fine reduced irons and sintered additives charged into the melter-gasifier are elutriated and loosened. Furthermore, when fine reduced irons and sintered additives are charged into the melter-gasifier, there is a problem in that permeability of gas and liquid in the coal packed bed of the melter-gasifier cannot be ensured.

In order to solve these problems, a method for briquetting fine reduced irons and additives and charging them into the melter-gasifier has been developed. Relating to the above development, U.S. Pat. No. 5,666,638 discloses a method for manufacturing oval-shaped briquettes made of sponge irons and an apparatus using the same. In addition, U.S. Pat. Nos. 4,093,455, 4,076,520, and 4,033,559 disclose a method for manufacturing plate-shaped or corrugation-shaped briquettes made of sponge irons and an apparatus using the same. Here, fine reduced irons are hot briquetted and then cooled, and thereby they are manufactured into briquettes made of sponge irons in order to suitably transport them a long distance.

A screw feeder arranged in a vertical direction is not suitable for manufacturing a large amount of briquettes made of sponge irons, but only for manufacturing a small amount of them. When briquettes made of sponge irons are manufactured by using the above method, if the charging amount of the fine reduced irons is increased in order to increase the manufacturing amount, fine reduced irons are not distributed well to a center portion of a longitudinal direction of the rolls, and thereby there is a problem in that the middle portion of a briquette is broken. In addition, since the length of the roll becomes longer as the roll for pressing and molding fine reduced irons is large-sized in a large-scaled installation, the charging amount of the fine reduced irons entering along the longitudinal direction of the rolls is not uniform, and a split phenomenon occurs. The split phenomenon means that the middle portion of a briquette made of sponge irons is broken. Therefore, a large amount of dust is produced when the briquettes are crushed in the next process.

SUMMARY OF THE INVENTION

The present invention has been made to solve the above-mentioned problems, and provides an apparatus for manufacturing compacted irons that is suitable for manufacturing a large amount of compacted irons.

In addition, the present invention provides an apparatus for manufacturing molten irons provided with the apparatus for manufacturing compacted irons.

The apparatus for manufacturing compacted irons according to the present invention includes a charging hopper into which reduced materials containing fine reduced irons are charged, screw feeders installed inside the charging hopper and making an acute angle with a vertical direction and discharging the reduced materials containing fine reduced irons which enter into the charging hopper, and a couple of rolls separated from each other to form a gap between the rolls. The couple of rolls compact the reduced materials containing fine reduced irons discharged from the charging hopper by the screw feeders and manufacture compacted irons. Each screw feeder is arranged side by side along an axis direction of the couple of rolls and an extension of the center axis of each screw feeder passes through the gap.

A plane comprising the center axis of each screw feeder may cross a plane comprising the axes of the couple of rolls at substantially a right angle.

An angle formed between the center axis of each screw feeder and the vertical direction is preferably in the range from 7 degrees to 9 degrees.

It is further preferable that the angle formed between the center axis of each screw feeder and the vertical direction is substantially 8 degrees.

It is preferable that an extension of the center axis of each screw feeder mutually crosses at a vertical line which passes through a center of the gap.

The amount of reduced materials containing fine reduced irons entered into the couple of rolls may be substantially uniform along a longitudinal direction of the couple of rolls.

The reduced materials may further include additives.

The apparatus for manufacturing compacted irons may further include a feeding box installed under the charging hopper, transferring reduced materials containing fine reduced irons to the couple of rolls and forming a bulged space under the charging hopper which faces the feeding box.

Guide tubes may be inserted into the feeding box.

The feeding box may include a slanted center portion which is bulged toward the charging hopper; and peripheral portions connected to each end of the center portion.

It is preferable that a slanted angle of the center portion of the feeding box relative to a horizontal plane is substantially the same as a slanted angle of an end surface of the guide tubes relative to a horizontal line.

A lower surface of the center portion of the feeding box is preferably installed to face the surface of the rolls.

A plurality of protruding portions may be formed on the lower surface of the center portion of the feeding box along a longitudinal direction of the rolls.

Supporting portions located at both sides of the rolls while supporting rotation of the rolls may be protruded on a lower surface of the feeding box.

A cooling passageway, which surrounds penetrating openings into which the guide tubes are inserted, may be formed in the feeding box.

An inlet port and an outlet port of the cooling passageway may be formed on the feeding box between the guide tubes.

The reduced materials containing fine reduced irons may enter into the feeding box and may be sealed inside the feeding box.

The charging hopper may include guide tubes extending to the gap and end portions of the guide tubes corresponding to the maximum length of the guide tubes may be protruded into the feeding box.

It is preferable that the charging hopper includes guide tubes extending to the gap and that the guide tubes are slanted relative to the vertical direction and end portions of the guide tubes surround the center of the gap in an axis direction of the roll.

End surfaces of the guide tubes are preferably shaped as an oval.

It is preferable that the length of each guide tube becomes longer as the guide tubes go away from the center of the gap.

A stepped portion may be formed on the outer surface of each guide tube.

It is preferable that a difference between the maximum length of the guide tubes and the minimum length of the guide tubes is in the range from 0.54r to 1.15r. Here, r is an inner radius of the guide tubes.

It is preferable that a plane including a maximum length and a minimum length of each guide tube crosses a plane including the axes of the couple of rolls at a substantially right angle.

It is preferable that an angle between the end surface of each guide tube and a horizontal direction is in the range from 20 degrees to 35 degrees.

A cooling medium may pass through the guide tubes.

An inner radius of the guide tubes preferably becomes longer according to a discharging direction of the reduced materials containing fine reduced irons.

A ratio of maximum length of the guide tubes to a difference between an inner radius of the inlet port of the guide tubes and an inner radius of the outlet port of the guide tubes is preferably in the range from 75 to 100.

Each guide tube may include an inner tube of the guide tube through which the reduced materials containing fine reduced irons pass, and an outer tube of the guide tube surrounding the inner tube of the guide tube.

A cooling medium may pass between the inner tube of the guide tubes and the outer tube of the guide tubes.

A spiral groove facing the inner tube of the guide tubes may be formed on the outer tube of the guide tubes, and the cooling medium may flow along the grooves shaped as spirals.

A cross-section of the grooves shaped as spirals is preferably shaped as a semicircle.

The cooling medium is preferably nitrogen.

It is preferable that one or more charging hopper scrapers are installed on the screw feeders in order to remove the reduced materials containing fine reduced irons stuck to the inner wall of the charging hopper.

A scraping surface of the charging hopper scrapers may be separated from the inner wall of the charging hopper at a uniform distance and extend in a longitudinal direction of the inner wall of the charging hopper.

The scraping surface, which is separated from the screw feeder, may form a space from the screw feeder.

Both ends of the scraping surface may be bent and may be fixedly connected to the screw feeder.

Both ends of the scraping surface may be bent with a curvature.

At least one of the both sides of the scraping surface is preferably formed to be slanted in a rotating direction of the screw feeder.

Bent lengths of the charging hopper scrapers removing the reduced materials containing fine reduced irons stuck to a slanted surface of the inner wall of the charging hopper, which are bent from both ends of the scraping surfaces and are extended to the surfaces of the screw feeders, may be different from each other.

It is preferable that a screw is installed on a lower portion of the center axis of each screw feeder, and that the charging hopper scrapers, having different bent lengths, are installed on a direct upper portion of the screws.

Each charging hopper scraper may include a scraping member removing the reduced materials containing fine reduced irons stuck to the inner wall of the charging hopper;

and a couple of supporting members connected to both ends of the scraping member and fixedly installed on the screw feeder.

The supporting member is preferably screw combined with the screw feeder.

The scraping member may include a scraping surface removing the reduced materials containing fine reduced irons stuck to the inner wall of the charging hopper and the scraping member may be bent from the scraping surface and is connected to the supporting member.

Bent lengths of the charging hopper scraper removing the reduced materials containing fine reduced irons stuck to a slanted surface of the inner wall of the charging hopper, which are bent from both ends of the scraping surface and are connected to the couple of supporting members, may be different from each other.

It is preferable that each charging hopper scraper includes a first supporting portion installed on a screw feeder, and a second supporting portion located under the first supporting portion and installed on the screw feeder, and that the bent length connected to the first supporting member is longer than the other bent length connected to the second supporting member.

Two or more charging hopper scrapers are preferably installed along a longitudinal direction of each screw feeder.

The two or more charging hopper scrapers may be alternately installed on the screw feeder in opposite directions with the screw feeder located between the charging hopper scrapers.

The apparatus for manufacturing compacted irons further includes a roll casing surrounding the couple of rolls, and roll scrapers installed to be connected between inner sides of the roll casing in a longitudinal direction of the rolls and removing compacted irons stuck to the surface of the rolls. The roll scrapers may be separated from the rolls.

The roll scrapers may be installed under the rolls.

A first surface of each roll scraper closely adhering to the removed compacted irons preferably makes an acute angle with a second surface of the roll scraper facing the surface of the rolls.

The acute angle is preferably in the range from 30 degrees to 60 degrees.

A separating distance between the roll scrapers and the rolls is preferably shorter than or equal to a separating distance between the couple of rolls.

The separating distance between the roll scrapers and the rolls is preferably in the range from 2 mm to 4 mm.

Each roll scraper may include a plurality of scraper rolls located corresponding to the couple of rolls.

Each scraper roll may include a scraping portion located corresponding to the couple of rolls and removing compacted irons, and a fixing portion supporting the scraping portion.

The scraping portions of the scraper rolls are preferably separated from each other.

A concave portion and a protruding portion may be continuously formed on the outer surface of the scraping portions.

A plurality of concave portions may be formed on the surface of the rolls and the concave portions of the rolls may face the protruding portions of the scraper rolls.

The separating distance between a roll and a roll scraper corresponding to the roll is preferably in the range from 3 mm to 5 mm.

Each roll scraper may further include a rotor connected between the inner sides of the roll casing in a longitudinal direction of the rolls and a couple of fixing blocks fixing both ends of the rotor. The plurality of scraper rolls may be installed on the rotor.

Each roll scraper may further include a bush inserted between each scraper roll and the rotor, a covering member supporting each scraper roll and bush in order for them not to fall, a stopper fixing each covering member on the rotor; and a fixing member fixing each fixing block on the roll casing.

The apparatus for manufacturing molten irons may include the above mentioned apparatus for manufacturing compacted irons, a crusher for crushing compacted irons discharged from the apparatus for manufacturing compacted irons and a melter-gasifier into which the compacted irons, which are crushed by the crusher, are charged and melted.

At least one of the coals selected from the group of lumped coals and coal briquettes may be supplied to the melter-gasifier.

BRIEF DESCRIPTION OF THE DRAWINGS

The above and other features and advantages of the present invention will become more apparent by describing in detail exemplary embodiments thereof with reference to the attached drawings.

DETAILED DESCRIPTION OF THE INVENTION

Now, exemplary embodiments of the present invention will be described with reference to the attached drawings in order for those skilled in the art to work out the present invention. However, the present invention can be embodied in various modifications and thus is not limited to the embodiments described below.

Embodiments of the present invention will be explained below with reference to FIGS. 1 to 16. The embodiments of the present invention are merely to illustrate the present invention and the present invention is not limited thereto.

Figure 1:
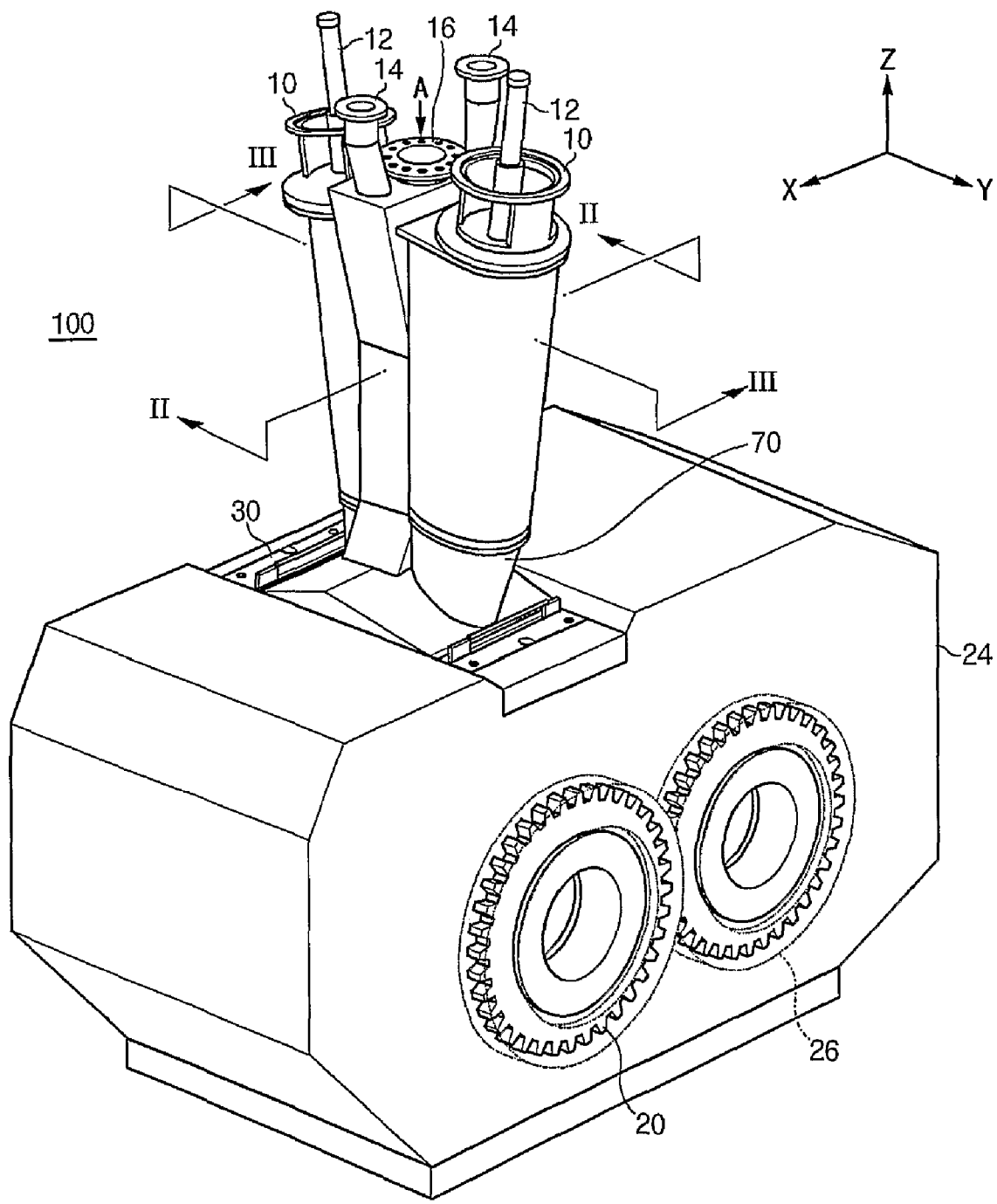
FIG. 1 is a perspective view of an apparatus for manufacturing compacted irons according to a first embodiment of the present invention.

FIG. 1 schematically shows an apparatus for manufacturing compacted irons 100 including a charging hopper 10 and a couple of rolls 20. Gears are attached to the ends of the couple of rolls 20, and thereby the couple of rolls 20 are interlocked and rotate together. The structure of the apparatus for manufacturing compacted irons shown in FIG. 1 is merely to illustrate the present invention and the present invention is not limited thereto. Therefore, the apparatus for manufacturing compacted irons can be modified in other forms.

The reduced materials containing fine reduced irons are charged into the charging hopper 10 through the opening 16 located in the center thereof along the direction indicated by the arrow A' as shown in FIG. 1. The reduced materials containing fine reduced irons are manufactured from iron ores. The reduced materials containing fine reduced irons further include sintered additives and are reduced while going through multi-stage fluidized-bed reactors. The reduced materials containing fine reduced irons manufactured by using other methods can be charged into the charging hopper 10. Ventilation openings 14 are formed on the upper portion of the charging hopper 10, thereby exhausting gas produced from the hot reduced materials containing fine reduced irons.

The charging hopper 10 includes guide tubes 70 extended downward. The guide tubes 70 are inserted into the feeding box 30 located below. The feeding box 30 closely adheres to the cheek plates 80 (shown in FIG. 2 hereinafter referred to the same) which are overlapped with the guide tubes 70 along the axis direction of the rolls 20 (Y-axis direction).

Screw feeders 12 are installed in the charging hopper 10 along the axis direction of the rolls 20 (Y-axis direction). Therefore, the reduced materials containing fine reduced irons are uniformly charged into the rolls 20 along a longitudinal direction of the couple of rolls 20. The screw feeders 12 discharge the reduced materials containing fine reduced irons charged into the charging hopper 10 to the gap between the couple of rolls 20. Here, the gap means a space formed between the rolls 20 along the longitudinal direction of the couple of rolls 20. Screws 122 (shown in FIG. 2) installed on lower ends of the screw feeders 12 discharge the reduced materials containing fine reduced irons collected in the lower portions of the screw feeders 12 downward using gravity by rotating by a motor (not shown). The motor is installed on the upper ends of the screw feeders 12.

The couple of rolls 20 are located in the roll casing 24. The couple of rolls 20 compress the reduced materials containing fine reduced irons discharged by the screw feeders 12, thereby manufacturing compacted irons. The couple of rolls 20 each include a roll core 202 (shown in FIG. 3) and a roll tire 204 (shown in FIG. 3) surrounding the roll core 202. Roll covers 26 are attached on both ends of the rolls 20.

Figure 2:
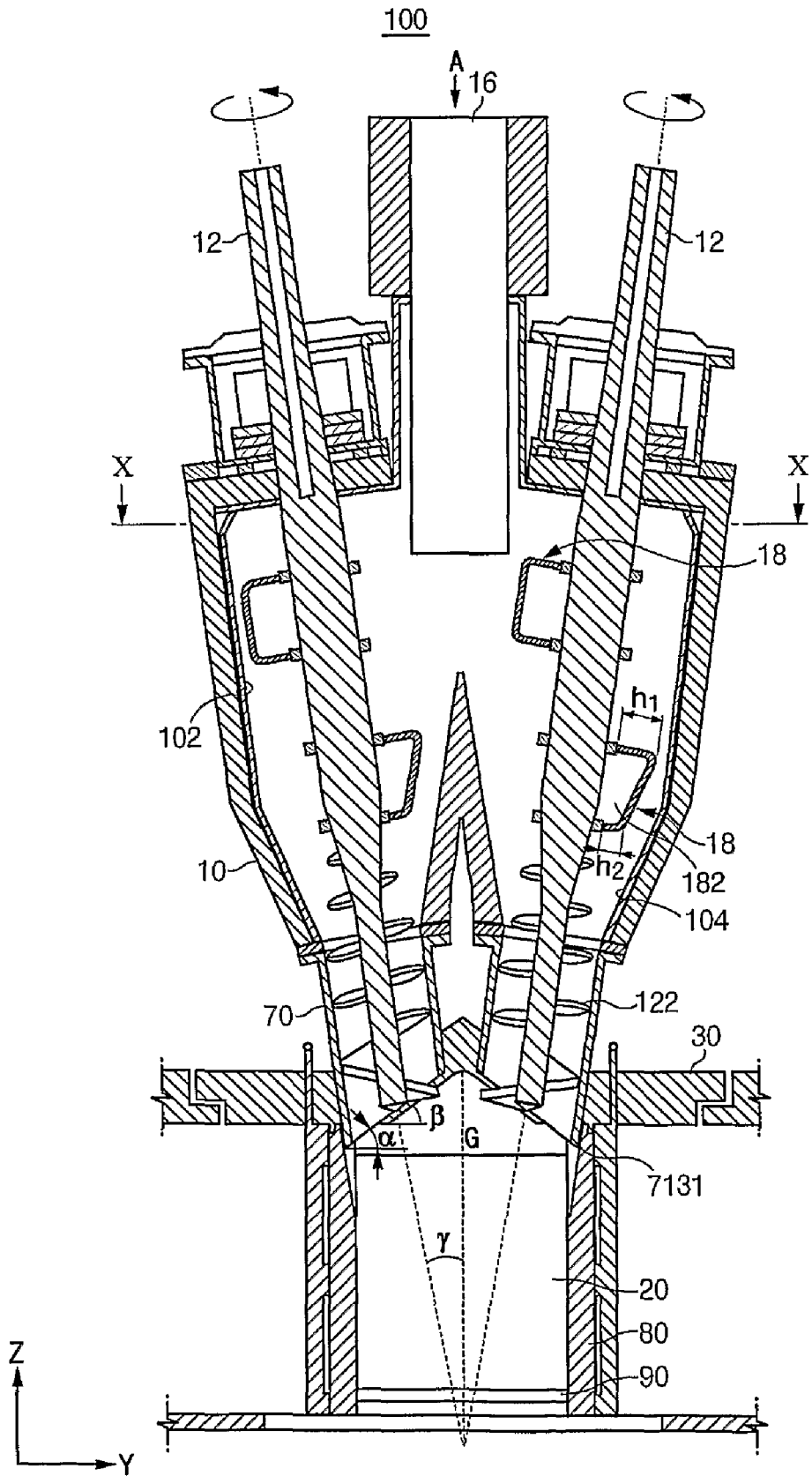
FIG. 2 is a sectional view along the line II-II of FIG. 1.

FIG. 2 shows a sectional structure of the apparatus for manufacturing compacted irons 100 shown in FIG. 1.

The reduced materials containing fine reduced irons enter into the feeding box 30 through the guide tubes 70 and by the screw feeders 12. The feeding box 30 is installed under the charging hopper 10 and transfers the reduced materials containing fine reduced irons to the couple of rolls 20.

Since the screw feeders 12 make an acute angle with a vertical direction, the reduced materials containing fine reduced irons can be easily charged into the center portion between the rolls 20. Namely, since the center portions of the screw feeders 12 are slanted and are directed to the center portion between the rolls 20, the reduced materials containing fine reduced irons can be easily charged into the center portion between the rolls 20. As shown in FIG. 2, extensions of the center axis of each screw feeder 12 cross each other at a line passing through the center of the gap G of the couple of rolls 20. Therefore, it is possible to minimize the amount of the reduced materials containing fine reduced irons elutriating outside and to increase the compaction ratio of the compacted irons.

The angle γ formed between the center axis of each screw feeder 12 and a vertical direction is preferably in the range from 7 degrees to 9 degrees. If the angle γ is less than 7 degrees, the reduced materials containing fine reduced irons are not smoothly supplied to the center portion between the rolls 20 since a direction of the center axis of each screw feeder 12 is almost the same as a vertical direction. Furthermore, since a large amount of the reduced materials containing fine reduced irons are elutriated by gas, it is impossible to compact them in the center portion between the rolls 20. In addition, if the angle γ is more than 9 degrees, a load is applied since the reduced materials containing fine reduced irons are concentrated only in the center portion between the rolls 20.

Especially, if the angle γ between the center axis of each screw feeder 12 and a vertical direction is substantially 8 degrees, it is possible to manufacture best quality compacted irons containing fine reduced irons. Here, substantially 8 degrees means 8 degrees exactly or very nearly 8 degrees.

One or more charging hopper scrapers 18 are installed on each screw feeder 12. A charging hopper scraper 18 means a scraper installed in the charging hopper 10. The charging hopper scrapers 18 remove the reduced materials containing fine reduced irons stuck to the inner wall 102 of the charging hopper 10. Although two charging hopper scrapers 18 are shown in FIG. 2, this is merely to illustrate the present invention and the present invention is not limited thereto. Therefore, a plurality of charging hopper scrapers 18 can be installed.

Both ends of a scraping surface of each charging hopper scraper 18 are bent and are fixedly connected to the screw feeders 12. Here, since both ends of the scraping surface are bent, its corner portions do not make an angle. Therefore, when the charging hopper scrapers 18 come in contact with the reduced materials containing fine reduced irons, operating resistance can be minimized.

The scraping surface 180 (shown in FIG. 10, hereinafter referred to the same) of the charging hopper scraper 18 is separated from the inner wall 102 of the charging hopper 10 at a uniform distance. The scraping surface is extended in a longitudinal direction of the inner wall 102 of the charging hopper 10. Therefore, hot reduced materials containing fine reduced irons stuck to the inner wall 102 of the charging hopper 10 can be easily removed since an area of the scraping surface, which faces the inner wall 102 of the charging hopper 10, becomes larger. In addition, the scraping surface is separated from the screw feeder 12, thereby forming a space therebetween. Therefore, the reduced materials containing fine reduced irons are passed through the space, and so a load, which is applied to the screw feeders 12 during rotation, can be minimized.

A charging hopper scraper 18 can be installed for a slanted surface 104 of the inner wall 102 of the charging hopper 10. In this case, bent lengths $h_1$ and $h_2$, which are bent from both ends of the scraping surface and are extended to the surface of the screw feeder 12, are different from each other. Accordingly, the charging hopper scraper 18 does not come in contact with the slanted surface 104 of the charging hopper 10 while hot reduced materials containing fine reduced irons stuck to the slanted surface 104 can be effectively eliminated.

Since the inner radius of the charging hopper 10 is decreased above the screws 122 in order to discharge the reduced materials containing fine reduced irons well, the slanted surface 104 is formed in the charging hopper 10. Therefore, it is preferable that charging hopper scrapers 18 having different bent lengths are installed directly above the screws 122.

The guide tubes 70 are extended to a gap G. As the guide tubes 70 go away from the center of the gap G, the lengths of the guide tubes 70 become longer. Therefore, when a large amount of compacted irons are manufactured, it is possible to prevent reduced materials containing fine reduced irons, which are discharged from the guide tubes 70, from elutriating. Especially, since the end portion 1731 of each guide tube 70 surrounds the center of the gap G in an axis direction of the rolls 20 (Y-axis direction), an amount of the reduced materials containing fine reduced irons elutriating outside can be minimized.

The end portion 1731 of each guide tube 70 corresponding to the longest length of the guide tubes 70 is protruded into the feeding box 30. Therefore, it is possible to prevent reduced materials containing fine reduced irons, which are discharged from the guide tubes 70, from elutriating.

In addition, each guide tube 70 makes an acute angle with a vertical direction. Therefore, when the reduced materials containing fine reduced irons are charged into the couple of rolls 20, the reduced materials containing fine reduced irons are uniformly distributed along a longitudinal direction of the rolls 20. Furthermore, the reduced materials containing fine reduced irons are smoothly charged into the center portion between the rolls 20. Therefore, it is possible to manufacture compacted irons having good quality.

Since the guide tubes 70 are slanted relative to a horizontal plane, it is possible to prevent the reduced materials containing fine reduced irons from elutriating. The slant angle is denoted by α in FIG. 2. It is preferable that the angle formed between an end surface 715 (shown in FIG. 5) of each guide tube 70 and a horizontal plane is in the range from 20 degrees to 35 degrees. Namely, the slanted angle α is preferably in the range from 20 degrees to 35 degrees.

If the slanted angle α is less than 20 degrees, reduced materials containing fine reduced irons do not enter into the center of the gap G well. If the slanted angle α is more than 35 degrees, a lower space of the feeding box 30 becomes larger. Therefore, since gas is stagnated in the upper portion of the lower space, fine reduced irons can be easily elutriated outside.

The feeding box 30 forms a bulged space toward a lower portion of the charging hopper 10. Therefore, the feeding box 30 can secure a stagnating layer of the reduced materials containing fine reduced irons, thereby suitably supplying the reduced materials containing fine reduced irons to the center of the gap G.

Particularly, a slanted angle β of the center portion of the feeding box 30 relative to a horizontal plane is the same as the slanted angle α of the end surface 715 of the guide tubes 70 relative to a horizontal plane. Namely, the slanted angle β is equal to, or is approximately similar to, the slanted angle α. Therefore, the reduced materials containing fine reduced irons entering into the gap G can be effectively distributed.

Figure 3:
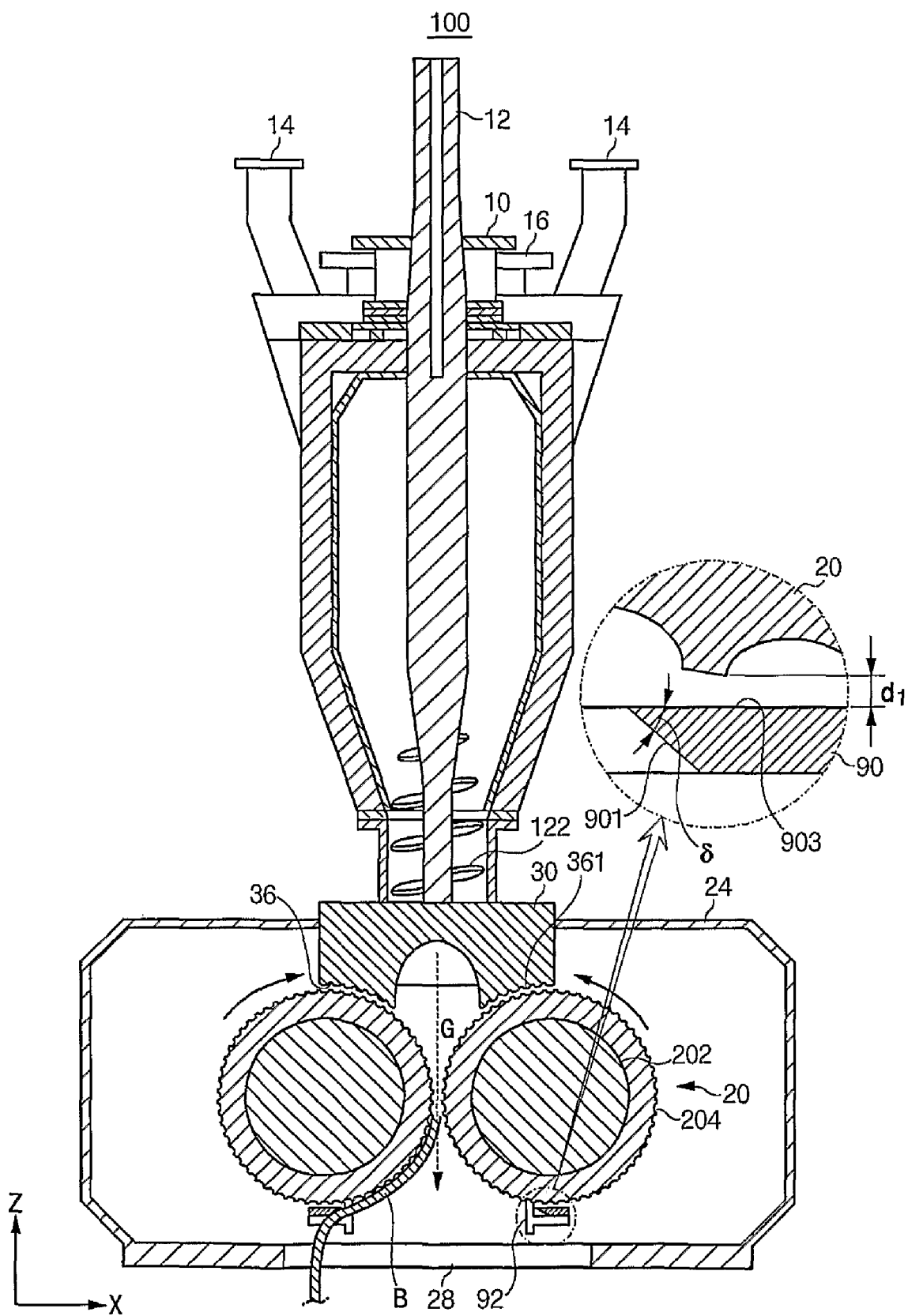
FIG. 3 is a sectional view along the line III-III of FIG. 1.

FIG. 3 shows another sectional structure of the apparatus for manufacturing compacted irons shown in FIG. 1.

As shown in FIG. 3, since an extension of the center axis of the screw feeders 12 passes through the gap G, the reduced materials containing fine reduced irons can be effectively charged into the gap G. The reduced materials containing fine reduced irons entering into the gap G are compressed by the rolls 20 rotating in directions indicated by arrows.

As shown in FIG. 3, compacted irons B molded by the rolls 20 can be continuously moved in a state of being stuck to the rolls 20. Therefore, the compacted irons B are removed from the surfaces of the rolls 20 by roll scrapers 90 installed under the rolls 20, Since the roll scrapers 90 are installed under the rolls 20, the compacted irons 80, which are stuck to the surface of the rolls 20, can be directly discharged through an outlet 28.

A roll scraper 90 does not mean a scraper shaped as a roll, but means a scraper attached near the rolls 20. The roll scrapers 90 are distinguished from the above-mentioned charging hopper scrapers 18 (shown in FIG. 2). Each roll scraper 90 can be installed near each roll 20 among the couple of rolls 20.

The enlarged circle of FIG. 3 shows a magnified sectional structure of a roll scraper 90. As shown in FIG. 3, each roll scraper 90 is supported by a scraper supporter 92 which is attached inside the roll casing 24. As shown in the enlarged circle of FIG. 3, each roll scraper 90 includes a first surface 901 and a second surface 903. The first surface 901 closely adheres to the removed compacted irons and the second surface 903 faces the surface of a roll 20. The first surface 901 makes an acute angle δ with the second surface 903. The portion corresponding to the acute angle δ is sharply protruded. Accordingly, the compacted irons stuck to the surface of the rolls 20 are removed from the rolls 20 by being caught by the portions corresponding to the acute angle δ. Therefore, the compacted irons B can be easily removed from the rolls 20.

The acute angle δ formed by the first surface 901 and the second surface 903 is preferably in the range of 30 degrees to 60 degrees. If the acute angle δ is less than 30 degrees, the portion corresponding to the acute angle δ is sharply protruded too far. Accordingly, the compacted irons B removed from the rolls 20 are stuck to the first surface 901 of the roll scraper 90 and are continuously moved in a horizontal direction. Therefore, the compacted irons B cannot be discharged into the outlet 28. If the acute angle is more than 60 degrees, the compacted irons 80 cannot be easily removed from the rolls 20 since the angle is too dull.

The separating distance $d_1$ between each roll scraper 90 and each roll 20 is preferably equal to or less than a distance between the couple of rolls 20, namely a width of a gap G. The roll scrapers 90 do not interfere with the rolls 20 because of the separation between the roll scrapers 90 from the rolls 20. Furthermore, the compacted irons stuck to the rolls 20 can be easily removed by controlling the separating distance $d_1$.

The separating distance $d_1$ is preferably in the range from 2 mm to 4 mm. The separating distance $d_1$ can be controlled by modifying the height of the roll scraper supporters 92 attached to the roll casing 24. If the separating distance $d_1$ is less than 2 mm, interference can be produced between the roll scrapers 90 and the rolls 20 due to the vibration caused by operating the apparatus for manufacturing compacted irons 100. In addition, if the separating distance $d_1$ is more than 4 mm, the compacted irons 80 stuck to the rolls 20 are difficult to be removed since the separating distance is too large.

The feeding box 30 forms a bulged space toward a lower portion of the charging hopper 10. Therefore, since the stagnating space for the reduced materials containing fine reduced irons can be secured in the feeding box 30, the reduced materials containing fine reduced irons can easily enter into the center portion between the rolls 20. The reduced materials containing fine reduced irons enter into the feeding box 30 and are sealed in the feeding box 30.

The lower surface 36 of the feeding box 30 faces a surface of the rolls 20. Namely, the lower surface 36 of the feeding box 30 is installed to be separated from the rolls 20 with a predetermined distance. The lower surface 36 is located in the center portion of the feeding box 30. Therefore, the reduced materials containing fine reduced irons can be prevented from elutriating outside, which is caused by rotating the rolls 20. Especially, a plurality of protruding portions 361 are formed on the lower surface 36 in a longitudinal direction of the rolls 20. Therefore, the reduced materials containing fine reduced irons cannot be elutriated outside since they are blocked by the protruding portions 361.

Figure 4:
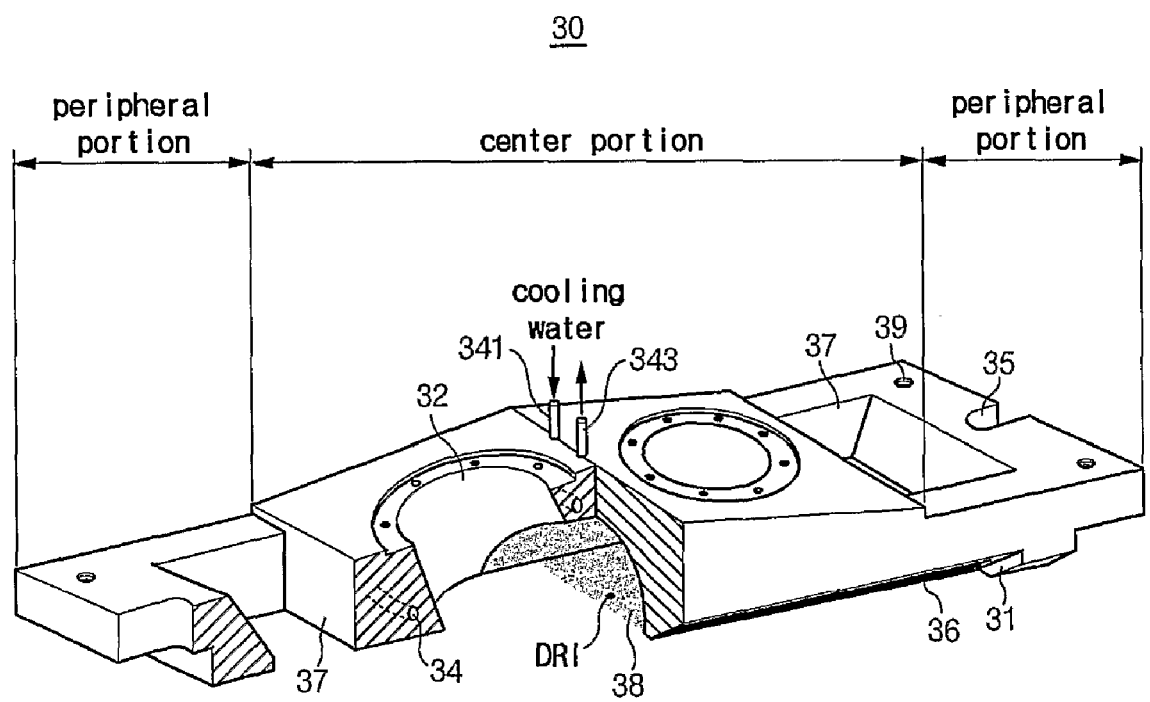
FIG. 4 is a schematic perspective view of a feeding box provided in the apparatus for manufacturing compacted irons according to the first embodiment of the present invention.

FIG. 4 shows a structure of the feeding box 30 in detail. The feeding box 30 means a member which is located above the couple of rolls 20 and forms a sealed space between the couple of rolls 20.

As shown in FIG. 4, the feeding box 30 includes a center portion and peripheral portions. The center portion is bulged toward the charging hopper and is slanted. The peripheral portions are connected to both ends of the center portion. An inlet port 341 and an outlet port 343 of a cooling passageway are installed in the center portion. Also, penetrating openings 32 into which the guide tubes are inserted are also formed on the center portion. Openings 37 into which the cheek plates are inserted are formed on the peripheral portions. In addition, openings for combining bolts 35 for fixing and holes 39 for adjusting the level are formed on the peripheral portions.

Supporting portions 31 are protruded toward the lower surface of the feeding box 30. The supporting portions 31 support rotation of the rolls 20 while locating both sides of the couple of rolls 20. Therefore, the rotating positions of the rolls 20 are not changed and an axis lineup is regularly maintained.

A cooling passageway 34 is formed in the feeding box 30. The cooling passageway 34 surrounds the penetrating openings 32. Cooling water can flow through the cooling passageway 34. The cooling water cools the reduced materials containing fine reduced irons entering into the feeding box 30. Therefore, heat transformation of the feeding box 30 can be prevented. Especially, even though reduced materials containing direct reduced irons (DRI) are concentrated in the lower space 38 of the feeding box 30, heat transformation of the feeding box 30 can be prevented. Since heat transformation is prevented, the reduced materials containing fine reduced irons are also prevented from elutriating. Particularly, heat transformation is minimized by concentrating the cooling passageway 34 on the center portion of the feeding box 30. The inlet port 341 and the outlet port 343 of the cooling passageway are installed between the guide tubes and on the feeding box 30. Therefore, since cooling water is quickly circulated in the center portion of the feeding box 30, the center portion of the feeding box 30 in a hot state can be smoothly cooled.

Figure 5:
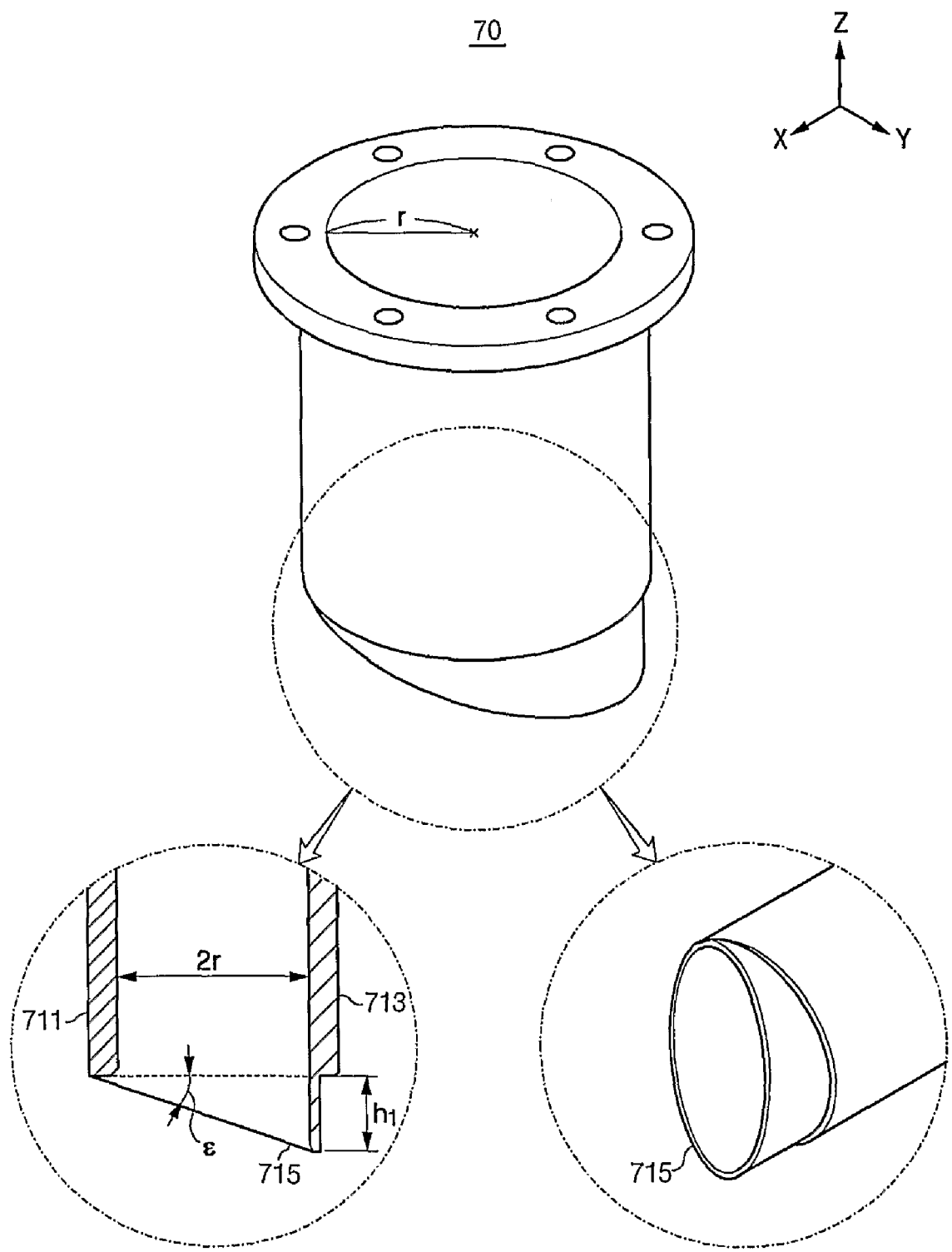
FIG. 5 is a schematic perspective view of a guide tube provided in the apparatus for manufacturing compacted irons according to the first embodiment of the present invention.

FIG. 5 schematically shows a guide tube 70 provided in the apparatus for manufacturing compacted irons according to the first embodiment of the present invention. The structure of the guide tube 70 shown in FIG. 5 is merely to illustrate the present invention and the present invention is not limited thereto. The left enlarged circle of FIG. 5 shows a section formed by cutting the guide tube 70 while including an edge 711 corresponding to the shortest length of the guide tube 70 and an edge 713 corresponding to the longest length of the guide tube 70. The right enlarged circle of FIG. 5 shows an end surface 715 of the guide tube 70 when seeing it from below.

Since the guide tube 70 is slanted, the end surface 715 is shaped as an oval. Therefore, the reduced materials containing fine reduced irons can be stably discharged. Namely, when the guide tubes 70 are installed in the apparatus for manufacturing compacted irons, the reduced materials containing fine reduced irons can be stably discharged into the gap since the guide tubes 70 surround the gap.

As shown in the right enlarged circle of FIG. 5, a stepped portion can be formed on the outer surface of the guide tube 70. The stepped portion is overlapped with the cheek plate 80 (shown in FIG. 2). Therefore, the reduced materials containing fine reduced irons are prevented from getting out of a space between the guide tubes 70 and the cheek plates 80, and thereby they are prevented from elutriating.

As shown in the left enlarged circle of FIG. 5, an edge 713 corresponding to the longest length of the guide tube 70 makes a slanted angle $\epsilon$ with an edge 711 corresponding to the shortest length thereof. The slanted angle $\epsilon$ is preferably in the range from 15 degrees to 30 degrees. If the slanted angle is less than 15 degrees, it is not effective to prevent the reduced materials containing fine reduced irons from elutriating even though the guide tube 70 is installed to be slanted. If the slanted angle is more than 30 degrees, the inner space of the feeding box becomes larger. Therefore, the reduced materials containing fine reduced irons can be elutriated outside due to stagnating gas.

The slanted angle $\epsilon$ will be explained in detail below. If the inner diameter of the guide tube 70 is referred to as 2r and the length difference between the edge 713 corresponding to the longest length of the guide tube 70 and the edge 711 corresponding to the shortest length of the guide tube 70 is referred to as $h_1$, the relationship between 2r and $h_1$ is indicated in Formula 1 below.

$$\tan \epsilon = h_1/2r \qquad \text{[Formula 1]}$$

Here, $\epsilon$ refers to a slanted angle formed by the edge corresponding to the longest length of the guide tube and the edge corresponding to the shortest length of the guide tube, $h_1$ refers to a length difference therebetween, and r refers to an inner radius of the guide tube.

If Formula 1 is transformed, $h_1=2r\cdot\tan\epsilon$. Since $\epsilon$ is in the range from 15 degrees to 30 degrees, $h_1$ is in the range from 2r·tan(15 degrees) to 2r·tan(30 degrees). Namely, $h_1$ is in the range from 0.54r to 1.15r.

Figure 6:
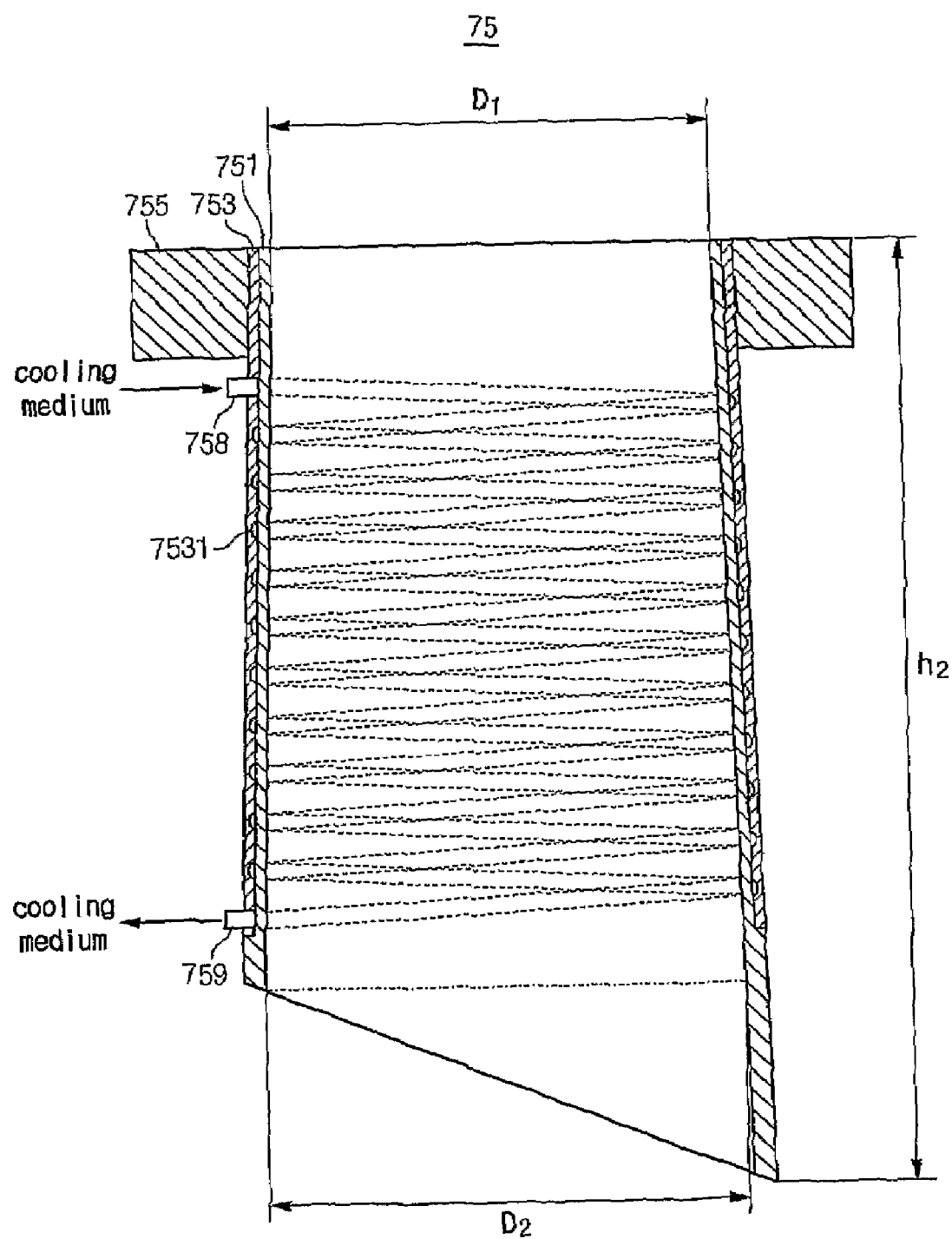
FIG. 6 is a sectional view of a guide tube provided in an apparatus for manufacturing compacted irons according to a second embodiment of the present invention.

FIG. 6 shows a guide tube 75 provided in the apparatus for manufacturing compacted irons according to a second embodiment of the present invention. As shown in FIG. 6, a cooling medium flows through the guide tube 75. Since hot reduced materials containing fine reduced irons pass through the guide tube 75, there is a possibility that the guide tube 75 is transformed. Therefore, a cooling medium is flowed through the guide tube 75 so that the guide tube 75 is cooled, and thereby heat transformation does not occur. Water, nitrogen, and so on can be used as the cooling medium. It is preferable to use nitrogen as the cooling medium for the sake of safety.

As shown in FIG. 6, the guide tube 75 is designed to become larger along a discharging direction of the reduced materials containing fine reduced irons. Namely, inner diameter $D_2$ of the outlet port of the guide tube 75 is larger than inner diameter $D_1$ of the inlet port thereof. The guide tube 75 is shaped as a taper. Therefore, the reduced materials containing fine reduced irons smoothly pass through from the upper portion of the guide tube 75 to the lower portion thereof.

If the longest length of the guide tube 75 is referred to as $h_2$, the ratio of the longest length $h_2$ of the guide tube 70 to the length difference between the inner diameter $D_1$ of the inlet port of the guide tube 75 and the inner diameter $D_2$ of the outlet port thereof is preferably in the range from 75 to 100. If the ratio is less than 75, it is difficult to apply to a design for an apparatus for manufacturing compacted irons since the length difference between the inner diameter $D_1$ of the inlet port of the guide tube 75 and the inner diameter $D_2$ of the outlet port thereof is too long. In addition, if the ratio is more than 100, the reduced materials containing fine reduced irons cannot be smoothly discharged since the inner diameter $D_1$ of the inlet port of the guide tube 75 becomes almost the same as the inner diameter $D_2$ of the outlet port thereof.

The guide tube 75 includes an inner tube 751 of the guide tube, an outer tube 753 of the guide tube, and a flange 755. Besides, the guide tube can include other parts. The reduced materials containing fine reduced irons pass through the inner tube 751 of the guide tube. The outer tube 753 of the guide tube surrounds an inner tube 751 of the guide tube. A flange 755 surrounding the upper portion of the outer tube 753 of the guide tube comes in contact with the charging hopper 10 located above. The flange 755 seals a space between the charging hopper 10 and the guide tube 75, and thereby the reduced materials containing fine reduced irons are not elutriated outside.

A cooling medium flows between the inner tube 751 of the guide tube and the outer tube 753 of the guide tube. Since the inner tube 751 of the guide tube closely adheres to the outer tube 753 of the guide tube, there is no possibility that the cooling medium leaks. A spiral groove 7531 is formed on the outer tube 753 of the guide tube. The spiral groove 7531 is connected from the cooling medium inlet port 758 to the cooling medium outlet port 759. The spiral groove 7531 completely surrounds the guide tube 75. Since the cooling medium flows along the spiral groove 7531, the guide tube 75 can be smoothly cooled. A section of the spiral groove 7531 can be formed to be shaped as a semicircle. In this case, it is easy to manufacture the guide tube 75.

Figure 7:
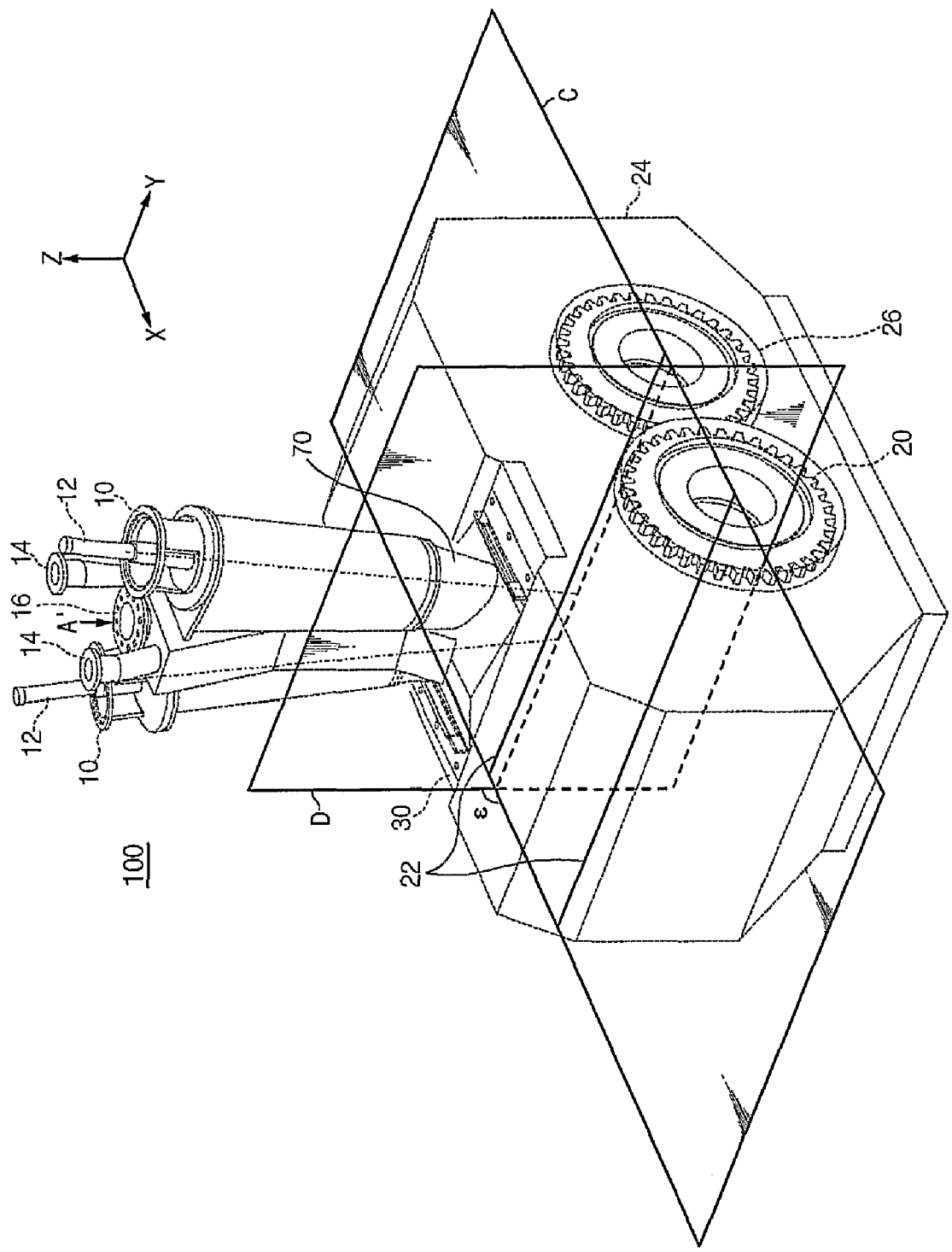
FIG. 7 shows a relationship between the screw feeders, guide tubes, and rolls provided in the apparatus for manufacturing compacted irons according to the first embodiment of the present invention.

FIG. 7 shows a relationship between the guide tubes 70 and the axes 22 of the rolls 20. In addition, FIG. 7 also shows a relationship between the screw feeders 12 and the axes 22 of the rolls 20. As shown in FIG. 7, a plane D including an edge corresponding to the maximum lengths and minimum lengths of the guide tubes 70 crosses a plane C including the axes 22 of the couple of rolls 20.

It is preferable that the angle $\epsilon$ made by crossing the plane C and the plane D is substantially a right angle. Namely, it is preferable that the angle $\epsilon$ is a right angle or is very near to a right angle. The plane D also includes center axes of the screw feeders 12. Therefore, the relationship between the center axes of the screw feeders 12 and the axes 22 of the rolls 20 is the same. Since the plane C and the plane D cross each other at substantially a right angle, the reduced materials containing fine reduced irons are smoothly supplied from the guide tubes 70 and the screw feeders 12 to the gap G. Therefore, compacted irons having good quality can be manufactured.

Figure 8A:
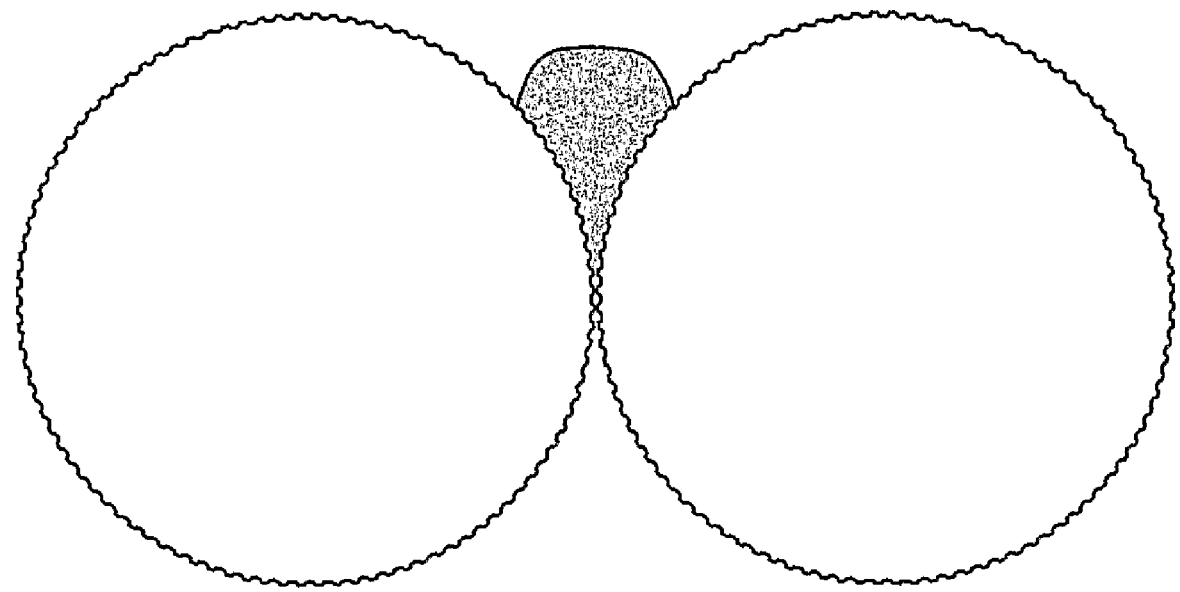
FIGS. 8A and 8B show a charging distribution of the reduced materials entering from a space between the screw feeders to the rolls according to the present invention and according to a prior art, respectively.
Figure 8B:
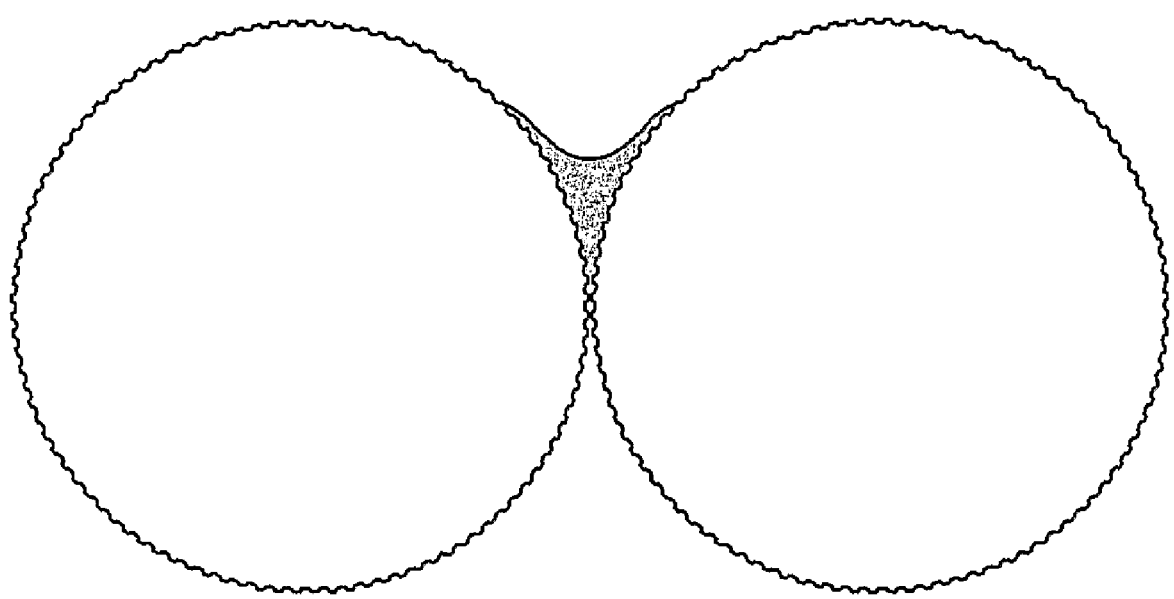

FIG. 8A and FIG. 8B show a charging distribution of the reduced materials containing fine reduced irons according to the present invention and according to the prior art, respectively. FIG. 8A and FIG. 8B show the reduced materials containing fine reduced irons which are located between screw feeders and are charged into the rolls. The screw feeders are installed to be slanted in the present invention of FIG. 8A while being installed in a vertical direction in the prior art of FIG. 8B.

Since the screw feeders are slanted in the present invention of FIG. 8A, reduced materials containing fine reduced irons are concentrated and are charged into the center portion between the rolls. Since the reduced materials containing fine reduced irons are charged with a slanted angle, a charging amount of the center portion between the rolls is suitably controlled. Therefore, an amount of the reduced materials containing fine reduced irons charged into the couple of rolls is substantially uniform along the longitudinal direction of the couple of rolls. Therefore, a large amount of the reduced materials containing fine reduced irons can be used, and thereby compacted irons having good quality can be manufactured.

On the contrary, the reduced materials containing fine reduced irons are transferred in a vertical direction in the prior art of FIG. 8B, and thereby the amount of the reduced materials containing fine reduced irons is not much between the screw feeders. Therefore, compacted irons having poor quality are manufactured, and for instance, the middle portion of the compacted irons is broken. Accordingly, a large amount of dust is produced when the compacted irons are crushed.

Figure 9A:
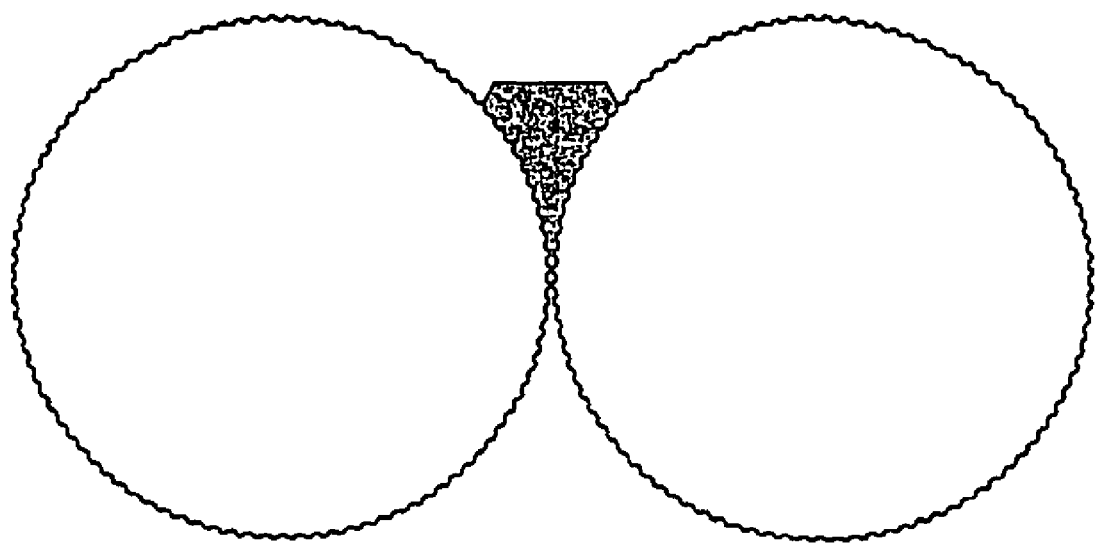
FIGS. 9A and 9B show a charging distribution of the reduced materials entering from a lower portion of the screw feeders to the rolls according to the present invention and according to a prior art, respectively.
Figure 9B:
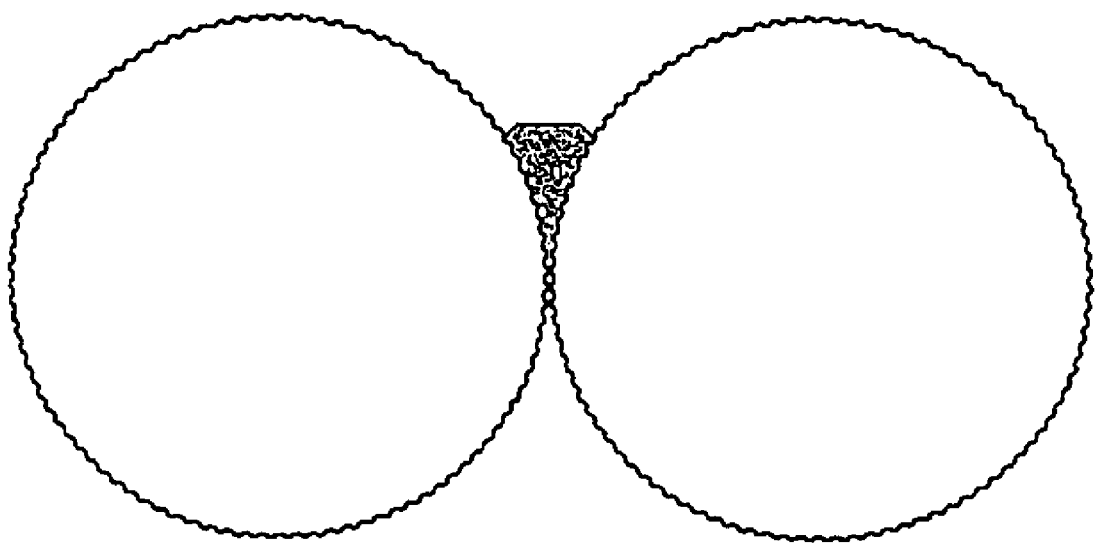

FIG. 9A and FIG. 9B show a charging distribution of the reduced materials containing fine reduced irons according to the present invention and according to the prior art, respectively. FIG. 9A and FIG. 9B show reduced materials containing fine reduced irons which are directly located under the screw feeders and enter into the roll. The screw feeders are installed to be slanted in the present invention of FIG. 9A while being installed in a vertical direction in the prior art of FIG. 9B.

Since the screw feeders are slanted in the present invention of FIG. 9A, a stagnating space of the reduced materials containing fine reduced irons is enlarged. Therefore, compacted irons having good quality can be manufactured since a large amount of the reduced materials containing fine reduced irons can be supplied to the rolls.

On the contrary, the space between the screw feeders and the rolls is not sufficient in the prior art of FIG. 9B since the screw feeders are located in a vertical direction. Therefore, a stagnating space of the reduced materials containing fine reduced irons is reduced. Accordingly, since the amount of the reduced materials containing fine reduced irons charged into the rolls becomes smaller, it is impossible to manufacture compacted irons having good quality. In addition, the stagnating space of the reduced materials containing fine reduced irons is not sufficient, and therefore the screw feeders are blocked and become out of order.

Figure 10:
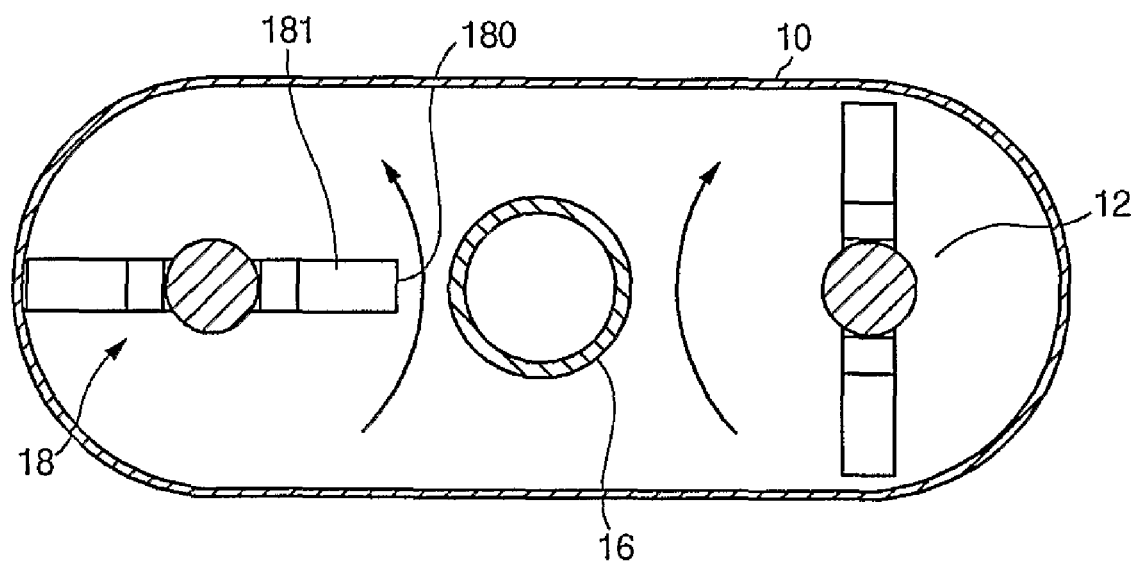
FIG. 10 is a sectional view along the line X-X of FIG. 2.

FIG. 10 shows an internal structure of the charging hopper 10 in which the screw feeders 12 are installed. As shown in FIG. 10, two or more charging hopper scrapers 18 are alternately installed on the screw feeders 12 in an opposite direction. Each screw feeder 12 is located between the charging hopper scrapers 18. Therefore, it is possible to maintain mechanical balance of the screw feeders 12.

The screw feeders 12 rotate in directions indicated by the arrows while removing the reduced materials containing fine reduced irons stuck to the charging hopper 10. The reduced materials containing fine reduced irons stuck to the charging hopper 10 can be effectively removed by moving a scraping surface 180. Therefore, the charging hopper 10 is not blocked by the reduced materials containing fine reduced irons.

Figure 11:
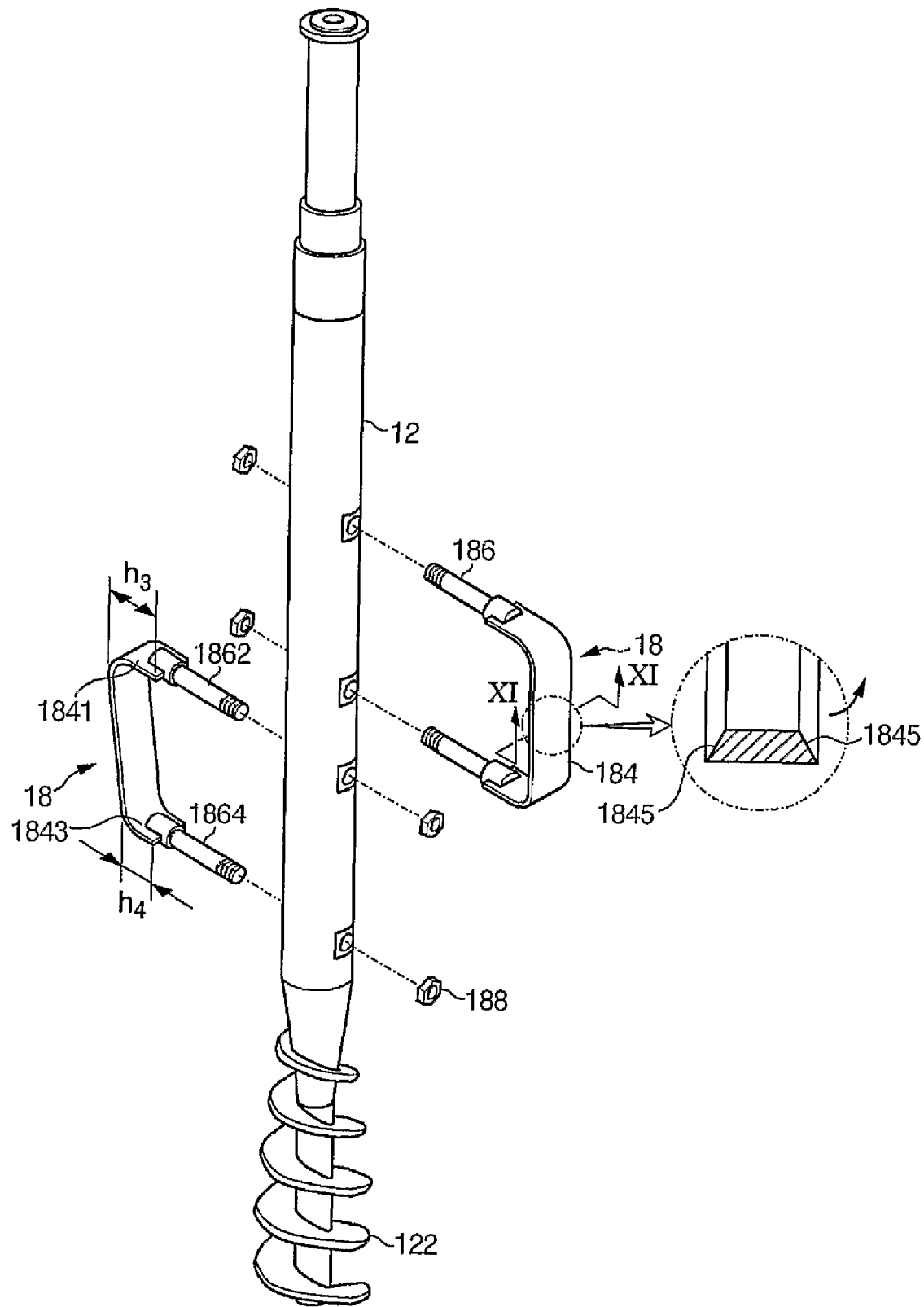
FIG. 11 is an exploded perspective view of a charging hopper scraper provided in the apparatus for manufacturing compacted irons according to the first embodiment of the present invention.

FIG. 11 shows an exploded state of the charging hopper scraper 18 shown in FIG. 10. The charging hopper scrapers 18 are screw combined with the screw feeders 12.

Each charging hopper scraper 18 includes a scraping member 184 and a couple of supporting members 186. Besides, the charging hopper scraper 18 can include other parts if necessary. The scraping member 184 removes the reduced materials containing fine reduced irons stuck to the inner wall 102 of the charging hopper 10. The couple of supporting members 186 are connected to both ends of the scraping member 184, respectively, and are fixed onto the screw feeder 12.

The scraping member 184 includes a scraping surface. The scraping surface is separated from the inner wall of the charging hopper at a predetermined distance. Both ends of the scraping surface are bent with a curvature. The scraping member 184 is bent from the scraping surface and is connected to the supporting members 186. Both ends of the scraping member 184 are bent and concave portions are formed thereon. Therefore, the supporting members 186 and the scraping member 184 can be easily combined with each other by inserting the supporting members 186 into the concave portion. A screw type groove is formed on the end of the supporting members 186. Each supporting member 186 penetrates a screw feeder 12 and is assembled with the screw feeder 12 with a nut 188.

The enlarged circle of FIG. 11 shows a section of the scraping surface of the scraping member 184 along a line XI-XI. The enlarged circle of FIG. 11 shows a state of seeing the scraping member 184 from above. At least one of both sides 1845 of the scraping surface is formed to be slanted in a rotating direction of the screw feeder 12. Although both sides 1845 of the scraping surface are drawn to be slanted in the enlarged circle of FIG. 11, this is merely to illustrate the present invention and the present invention is not limited thereto. Therefore, at least one side among both sides 1845 of the scraping surface may be formed to be slanted in a rotating direction of the screw feeder 12. Accordingly, when the screw feeder 12 rotates in a direction indicated by an arrow, the reduced materials containing fine reduced irons caught in the scraping surface can be easily removed.

Especially, when the reduced materials containing fine reduced irons stuck to the slanted wall of the charging hopper should be removed, a structure of the charging hopper scraper 18 can be modified like below. In the charging hopper scraper 18 installed on the lower portion of the screw feeder 12, both ends of the scraping surface are bent and are connected to the couple of supporting members 186. Bent lengths $h_3$ and $h_4$ are different from each other when connecting to the couple of supporting members 186.

The supporting members 186 include first supporting members 1862 and second supporting members 1864. The first supporting members 1862 and the second supporting members 1864 are attached to the screw feeders 12. The second supporting members 1864 are located under the first supporting members 1862. The bent length $h_3$ connected between an end of the scraping surface and the first supporting member 1862 is longer than the bent length $h_4$ connected between an end of the scraping surface and the second supporting member 1864. Accordingly, the scraping surface is located to be slanted toward the lower portion of the inner wall of the charging hopper. Therefore, the reduced materials containing fine reduced irons can be easily removed without the scraping surface coming into contact with the inner wall of the charging hopper.

Figure 12:
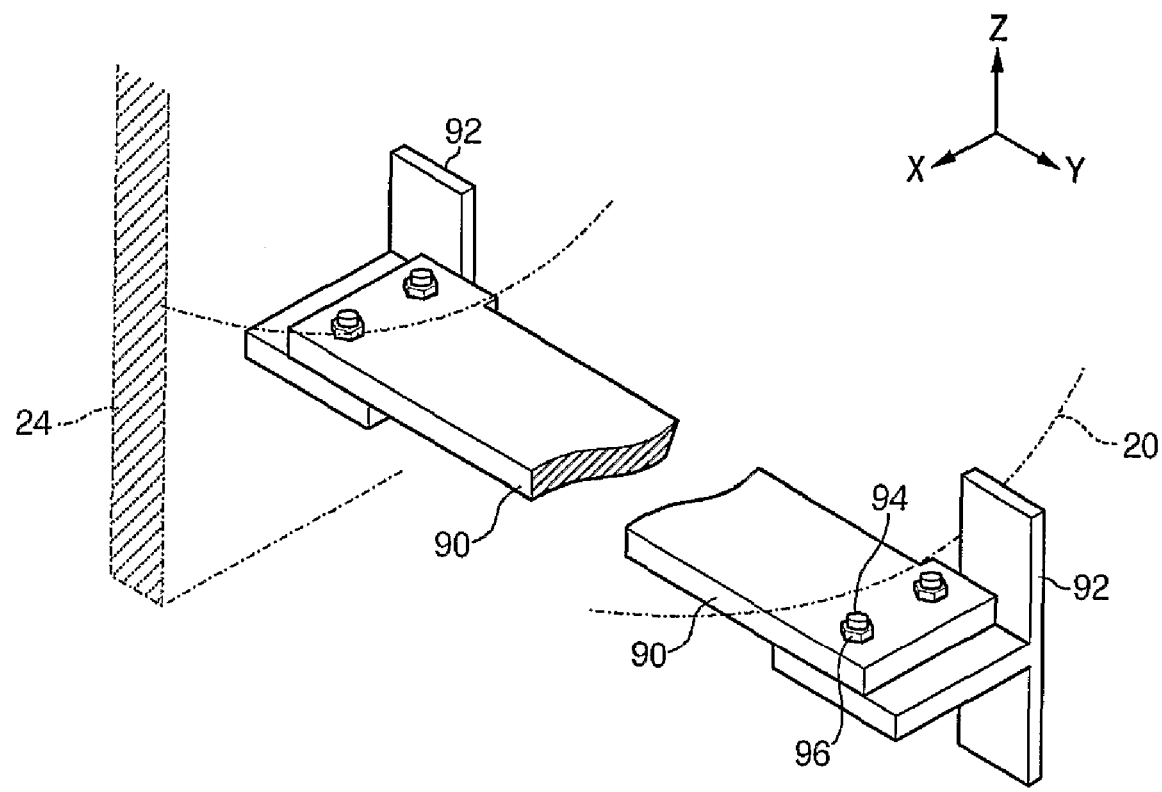
FIG. 12 schematically shows a roll scraper provided in the apparatus for manufacturing compacted irons according to the first embodiment of the present invention.

FIG. 12 shows the roll scraper 90 shown in FIG. 3 in detail. The roll scraper 90 is installed to connect to inner sides of the roll casing 24. In FIG. 12, rolls 20 and a roll casing 24 are indicated by dotted lines for convenience.

As shown in FIG. 12, the roll scraper 90 is installed in a longitudinal direction (Y-axis direction) of the rolls 20. The roll scraper 90 is installed above the roll scraper supporter 92. The roll scraper 90 is firmly fixed on the roll scraper supporter 92 with screws 94 and bolts 96. On the contrary, the roll scraper 90 may be fixed on the roll scraper supporter 92 by welding. Since the roll scraper 90 is firmly fixed on the roll scraper supporter 92, a separating distance between the roll scraper 90 and the roll 20 is stably secured even though the apparatus for compacted irons is vibrated during manufacturing compacted irons.

Figure 13:
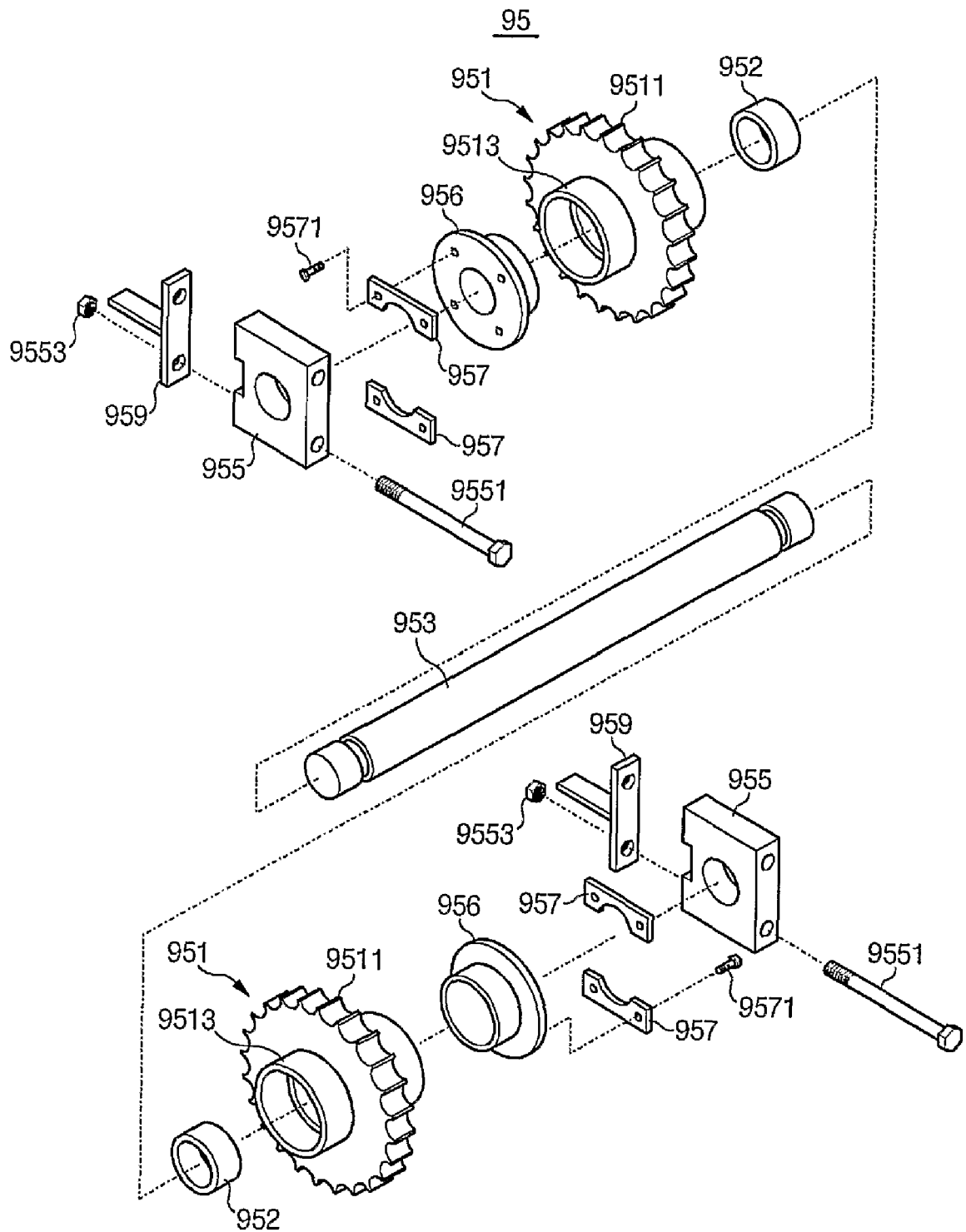
FIG. 13 is an exploded perspective view of a roll scraper provided in the apparatus for manufacturing compacted irons according to a third embodiment of the present invention.

FIG. 13 shows an exploded state of another roll scraper 95 provided in the apparatus for manufacturing compacted irons according to a third embodiment of the present invention. The roll scraper 95 is also installed to be connected between inner sides of the roll casing. Therefore, the roll scraper 95 is shaped as being longitudinally extended along a rotor 953.

As shown in FIG. 13, the roll scraper 95 includes scraper rolls 951, a rotor 953, and fixing blocks 955. Besides, the roll scraper 95 further includes bushes 952, stoppers 957, covering members 956, and base members 959. Although two scraper rolls 951 are shown in FIG. 13, this is merely to illustrate the present invention and the present invention is not limited thereto. Therefore, a plurality of scraper rolls 951 can be installed.

The rotor 953 is shaped as a cylindrical rod and supports the roll scraper 95. The scraper rolls 951, the bushes 952, and the covering members 956 are assembled with the rotor 953. The stoppers 957 are fixed on the covering members 956 with bolts 9571 in order to fix them. The stoppers 957 are pressed to the rotor 953 and fix the scraper rolls 951, the bushes 952, and the covering members 956. The rotor 953 is fixed on the fixing blocks 955 and the fixing blocks 955 are supported by base members 959 with bolts 9551 and nuts 9553.

Each scraper roll 951 includes a scraping portion 9511 and a fixing portion 9513. The scraping portion is formed on the fixing portion 9513. The fixing portion 9513 is shaped as a cylinder and is combined with the bush 952. The scraping portion 9511, interlocked with the roll, rotates and thereby removes compacted irons stuck to the roll.

The scraper roll 951 repeats an idling operation while fixed on the bush 952. The bush 952 is inserted between the rotor 953 and the scraper roll 951, thereby smoothly rotating the scraper roll 951. The bush 952 is shaped as a cylinder. The base member 959 shaped as a character "T" is welded to the roll casing and firmly supports the rotor 953.

Figure 14:
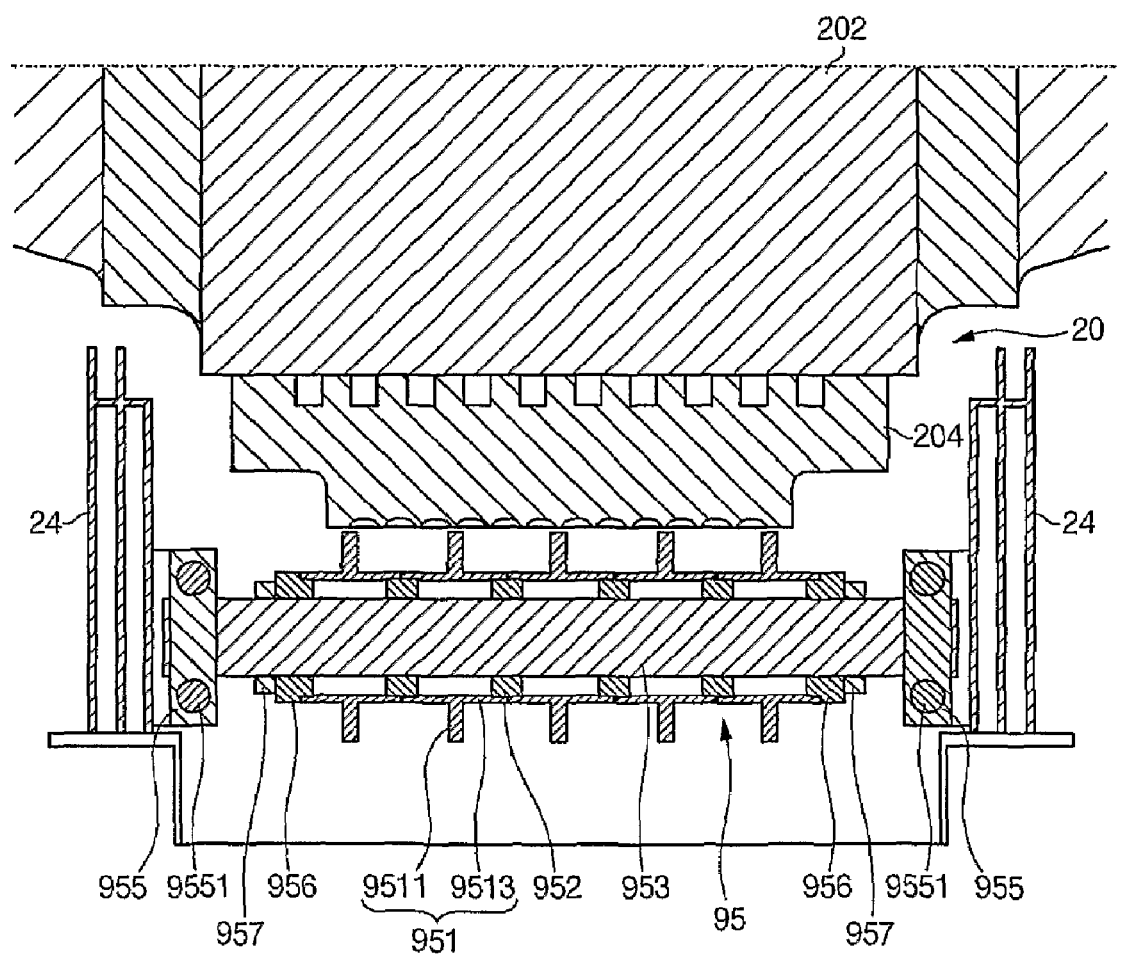
FIG. 14 shows a sectional structure of the roll scraper shown in FIG. 13.

FIG. 14 shows a sectional structure of a state of the roll scrapers 95 installed in the apparatus for manufacturing compacting irons 100. As shown in FIG. 14, five scraper rolls 951 are continuously installed on one roll scraper 95.

By using five scraper rolls 951, as shown in FIG. 14, the compacted irons stuck to the roll 20 can be easily removed. Especially, since the scraper rolls 951 are firmly fixed by the fixing blocks 955, and so on, their function is sufficiently shown even though the roll 20 rotates at a high speed.

The operation procedure of the roll scraper 95 will be explained below with reference to FIGS. 15A and 15B.

Figure 15A:
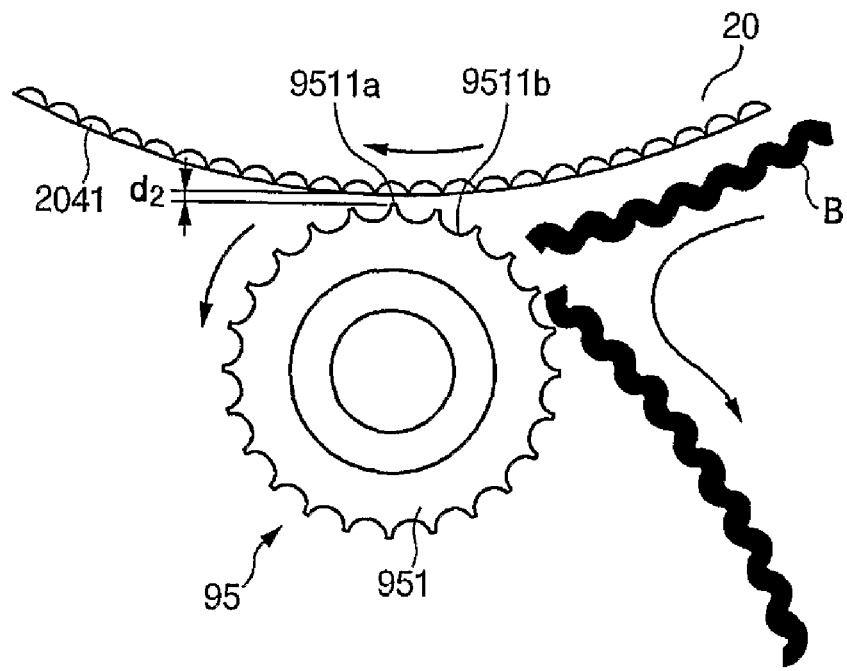
FIGS. 15A and 15B are conceptual views of operating the roll scrapers.

FIG. 15A shows a state when the compacted irons B stuck to the roll 20 are broken while colliding with the roll scraper 95. The roll 20 rotates in a clockwise direction while the roll scraper 95 rotates in a counter clockwise direction. As shown in FIG. 15A, the compacted irons B collide with the roll scraper 95 thereby being broken to fall from the roll 20. Therefore, it is possible to prevent the compacted irons B from sticking to the roll and rotating with it.

As shown in FIG. 15A, a plurality of concave portions 9511b and protruding portions 9511a are continuously formed on an outer surface of the scraper roll 951 of the roll scraper 95. The concave portions 9511b and the protruding portions 9511a cut the compacted irons B and remove them from the roll 20.

A plurality of concave portions 2041 are formed on the surface of the roll 20 and the concave portions 2041 of the roll 20 face protruding portions 9511a of the scraper roll 951. Namely, the roll 20 and the scraper roll 951 play a role of a rack and a pinion, respectively, and thereby the compacted irons B are prevented from sticking to the roll 20.

As shown in FIG. 15A, the separating distance $d_2$ between the roll scraper 95 and the roll 20 is preferably in the range from 3 mm to 5 mm. If the separating distance $d_2$ between the roll scraper 95 and the roll 20 is less than 3 mm, there is a possibility that they come in contact with each other since the separating distance $d_2$ between them is too short. In addition, if the separating distance $d_2$ between the roll scraper 95 and the roll 20 is more than 5 mm, the compacted irons B are not easily removed from the roll 20 since the separating distance $d_2$ between them is too long.

Figure 15B:
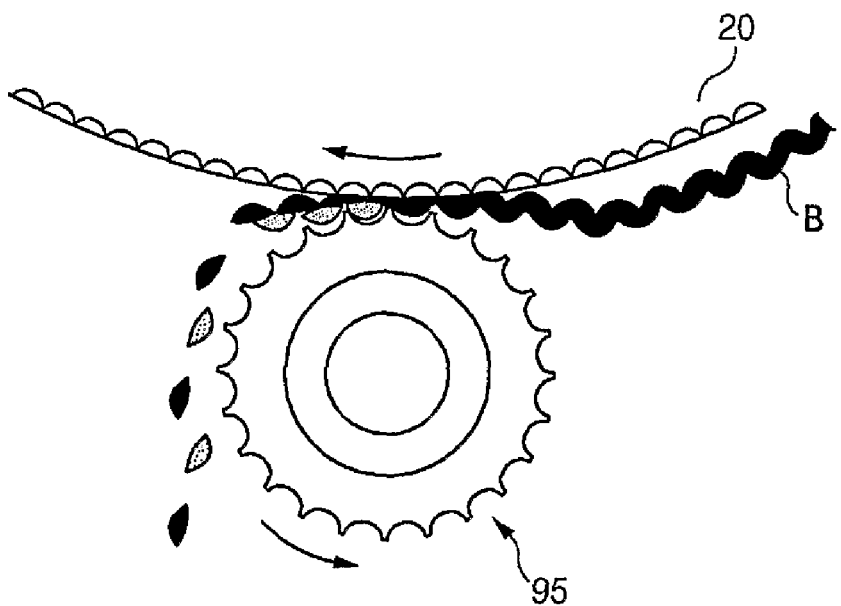

FIG. 15B shows a state that the compacted irons B stuck to the roll 20 are inserted between the roll 20 and the roll scraper 95, are crushed, and then fall. As shown in FIG. 15B, since the roll 20 and the roll scraper 95 rotate together while crushing the compacted irons B, the compacted irons are prevented from sticking to the roll 20.

Figure 16:
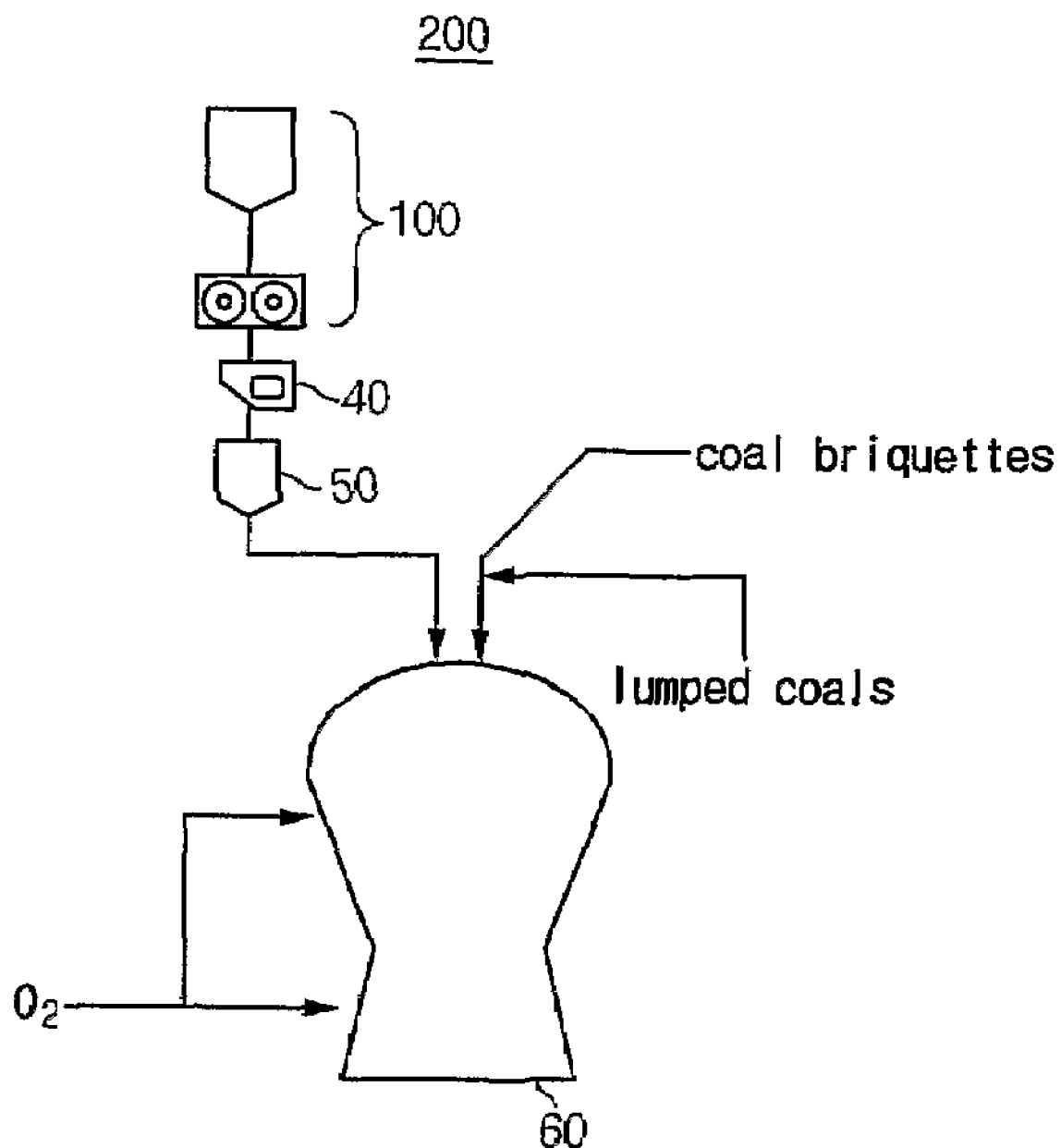
FIG. 16 shows an apparatus for manufacturing molten irons provided with the apparatus for manufacturing compacted irons according to the first embodiment of the present invention.

FIG. 16 shows an apparatus for manufacturing molten irons 200 provided with an apparatus for manufacturing compacted irons 100 according to the first embodiment of the present invention. Although the apparatus for manufacturing molten irons 200 provided with an apparatus for manufacturing compacted irons 100 according to the first embodiment of the present invention is shown in FIG. 16, this is merely to illustrate the present invention and the present invention is not limited thereto. Therefore, the apparatus for manufacturing molten irons 200 can be provided with apparatuses for manufacturing compacted irons according to the second embodiment and the third embodiment of the present invention.

The apparatus for manufacturing molten irons 200 shown in FIG. 16 includes the apparatus for manufacturing compacted irons 100, a crusher 40, and a melter-gasifier 60. The crusher 40 crushes the compacted irons discharged from the apparatus for manufacturing compacted irons. The compacted irons, which were crushed in the crusher 40, are charged into the melter-gasifier 60 and are melted therein. Besides, a storage bin 50 for temporarily storing the compacted irons that are crushed in the crusher 40 can be also included. Since the structure of the crusher 40 and the melter-gasifier 60 can be understood by those skilled in the art, a detailed explanation is omitted.

At least one of the coals selected from the group of lumped coals and coal briquettes are charged into the melter-gasifier 60. Generally, for example, the lumped coals are coals having grain size of more than 8 mm which are gathered from the producing district. In addition, for example, the coal briquettes are coals which are made by gathering coals having grain size of 8 mm or less from the producing district, pulverizing them, and molding them by a press.

The coal packed bed is formed in the melter-gasifier 60 by charging lumped coals or coal briquettes therein. Oxygen is supplied to the melter-gasifier 60 and then the compacted irons are melted. Molten irons are discharged through a tap. Therefore, it is possible to manufacture molten irons having good quality.

Since the apparatus for manufacturing compacted irons according to the present invention has the above structure, it is suitable for manufacturing compacted irons from a large amount of the reduced materials containing fine reduced irons. In addition, since the apparatus for manufacturing molten irons includes the above apparatus for manufacturing compacted irons, it is possible to manufacture molten irons having good quality.

While the present invention has been particularly shown and described with reference to exemplary embodiments thereof, it will be understood by those skilled in the art that various changes in form and details may be made therein without departing from the sprit and scope of the invention as defined by the appended claims.

What is claimed is:

1. An apparatus for manufacturing compacted irons comprising:
   a charging hopper into which reduced materials containing fine reduced irons are charged;
   screw feeders installed inside the charging hopper and making an acute angle with a vertical direction, the screw feeders discharging the reduced materials containing fine reduced irons which enter into the charging hopper; and
   a couple of rolls separated from each other to form a gap between the rolls, the couple of rolls compacting the reduced materials containing fine reduced irons discharged from the charging hopper by the screw feeders and manufacturing compacted irons,
   wherein each screw feeder is arranged side by side along an axis direction of the couple of rolls and an extension of the center axis of each screw feeder passes through the gap, and
   wherein the apparatus for manufacturing compacted irons further comprises a feeding box installed under the charging hopper, transferring reduced materials containing fine reduced irons to the couple of rolls and forming a bulged space under the charging hopper which faces the feeding box.

2. The apparatus for manufacturing compacted irons of claim 1, wherein a plane comprising the center axes of the screw feeders crosses a plane comprising the axes of the couple of rolls at substantially a right angle.

3. The apparatus for manufacturing compacted irons of claim 1, wherein an angle formed between the center axis of each screw feeder and the vertical direction is in the range from 7 degrees to 9 degrees.

4. The apparatus for manufacturing compacted irons of claim 3, wherein the angle formed between the center axis of each screw feeder and vertical direction is substantially 8 degrees.

5. The apparatus for manufacturing compacted irons of claim 1, wherein the extensions of the center axis of each screw feeder mutually cross at a vertical line which passes through a center of the gap.

6. The apparatus for manufacturing compacted irons of claim 1, wherein the amount of the reduced materials containing fine reduced irons entered into the couple of rolls is substantially uniform along a longitudinal direction of the couple of rolls.

7. The apparatus for manufacturing compacted irons of claim 1, wherein the reduced materials further comprise additives.

8. The apparatus for manufacturing compacted irons of claim 1, wherein guide tubes are inserted into the feeding box.

9. The apparatus for manufacturing compacted irons of claim 1, wherein the feeding box comprises: a slanted center portion which is bulged toward the charging hopper; and peripheral portions connected to each end of the center portion.

10. The apparatus for manufacturing compacted irons of claim 1, wherein a slanted angle of a center portion of the feeding box relative to a horizontal plane is substantially the same as a slanted angle of an end surface of each guide tube relative to a horizontal line.

11. The apparatus for manufacturing compacted irons of claim 1, wherein a lower surface of a center portion of the feeding box is installed to face the surface of the rolls.

12. The apparatus for manufacturing compacted irons of claim 11, wherein a plurality of protruding portions are formed on the lower surface of the center portion of the feeding box along a longitudinal direction of the rolls.

13. The apparatus for manufacturing compacted irons of claim 1, wherein a supporting portion located at both sides of the rolls while supporting rotation of the rolls is protruded on a lower surface of the feeding box.

14. The apparatus for manufacturing compacted irons of claim 1, wherein a cooling passageway, which surrounds penetrating openings into which the guide tubes are inserted, is formed in the feeding box.

15. The apparatus for manufacturing compacted irons of claim 14, wherein an inlet port and an outlet port of the cooling passageway are formed on the feeding box between the guide tubes.

16. The apparatus for manufacturing compacted irons of claim 1, wherein the reduced materials containing fine reduced irons enter into the feeding box and are sealed in the feeding box.

17. The apparatus for manufacturing compacted irons of claim 1, wherein the charging hopper comprises guide tubes extending into the gap and
wherein an end portion of each guide tube corresponding to the maximum length of the guide tube is protruded into the feeding box.

18. The apparatus for manufacturing compacted irons of claim 1, wherein the charging hopper comprises guide tubes extending to the gap and
wherein the guide tubes are slanted relative to the vertical direction and end portions of each guide tube surround the center of the gap in an axis direction of the rolls.

19. The apparatus for manufacturing compacted irons of claim 18, wherein the end surfaces of the guide tubes are shaped as an oval.

20. The apparatus for manufacturing compacted irons of claim 18, wherein the length of the guide tubes becomes longer as the guide tubes go away from the center of the gap.

21. The apparatus for manufacturing compacted irons of claim 20, wherein a stepped portion is formed on the outer surface of the guide tubes.

22. The apparatus for manufacturing compacted irons of claim 20, wherein the difference between the maximum length of the guide tubes and the minimum length of the guide tubes is in the range from 0.54r to 1.15r,
wherein, r is an inner radius of the guide tube.

23. The apparatus for manufacturing compacted irons of claim 20, wherein a plane comprising the maximum length and the minimum length of each guide tube crosses a plane comprising the axes of the couple of rolls at substantially a right angle.

24. The apparatus for manufacturing compacted irons of claim 20, wherein an angle between the end surface of each guide tube and a horizontal direction is in the range from 20 degrees to 35 degrees.

25. The apparatus for manufacturing compacted irons of claim 18, wherein a cooling medium passes through the guide tubes.

26. The apparatus for manufacturing compacted irons of claim 18, wherein an inner radius of the guide tubes becomes longer according to a discharging direction of the reduced materials containing fine reduced irons.

27. The apparatus for manufacturing compacted irons of claim 26, wherein a ratio of the maximum length of the guide tubes to a difference between an inner radius of the inlet port of the guide tubes and an inner radius of the outlet port of the guide tubes is in the range from 75 to 100.

28. The apparatus for manufacturing compacted irons of claim 18, wherein each guide tube comprises:
an inner tube of the guide tube through which the reduced materials containing fine reduced irons pass; and
an outer tube of the guide tube surrounding the inner tube of the guide tube.

29. The apparatus for manufacturing compacted irons of claim 28, wherein a cooling medium passes between the inner tube of the guide tube and the outer tube of the guide tube.

30. The apparatus for manufacturing compacted irons of claim 29, wherein a spiral groove facing the inner tube of the guide tube is formed on the outer tube of the guide tube, and wherein the cooling medium flows along the grooves shaped as spirals.

31. The apparatus for manufacturing compacted irons of claim 30, wherein the section of the grooves shaped as spirals is shaped as a semicircle.

32. The apparatus for manufacturing compacted irons of claim 18, wherein the cooling medium is nitrogen.

33. The apparatus for manufacturing compacted irons of claim 1, wherein one or more charging hopper scrapers are installed on each screw feeder in order to remove the reduced materials containing fine reduced irons stuck to an inner wall of the charging hopper.

34. The apparatus for manufacturing compacted irons of claim 33, wherein a scraping surface of the charging hopper scrapers is separated from the inner wall of the charging hopper at a uniform distance and extends in a longitudinal direction of the inner wall of the charging hopper.

35. The apparatus for manufacturing compacted irons of claim 34, wherein the scraping surface, which is separated from the screw feeder, forms a space from the screw feeder.

36. The apparatus for manufacturing compacted irons of claim 34, wherein both ends of the scraping surface are bent and are fixedly connected to the screw feeder.

37. The apparatus for manufacturing compacted irons of claim 36, wherein both ends of the scraping surface are bent with a curvature.

38. The apparatus for manufacturing compacted irons of claim 34, wherein at least one of the both sides of the scraping surface is formed to be slanted in a rotating direction of the screw feeder.

39. The apparatus for manufacturing compacted irons of claim 33, wherein bent lengths of the charging hopper scraper removing the reduced materials containing fine reduced irons stuck to a slanted surface of the inner wall of the charging hopper, which are bent from both ends of the scraping surface and are extended to the surface of the screw feeder, are different from each other.

40. The apparatus for manufacturing compacted irons of claim 39, wherein a screw is installed on a lower portion of the center axis of each screw feeder, and wherein the charging hopper scraper having the different bent lengths is installed directly above an upper portion of the screw.

41. The apparatus for manufacturing compacted irons of claim 33, wherein the charging hopper scraper comprises:
a scraping member removing the reduced materials containing fine reduce irons stuck to the inner wall of the charging hopper; and
a couple of supporting members connected to both ends of the scraping member and fixedly installed on the screw feeder.

42. The apparatus for manufacturing compacted irons of claim 41, wherein the supporting members are screw combined with the screw feeder.

43. The apparatus for manufacturing compacted irons of claim 41, wherein the scraping member comprises a scraping surface removing the reduced materials containing fine reduced irons stuck to the inner wall of the charging hopper and wherein the scraping member is bent from the scraping surface and is connected to the supporting member.

44. The apparatus for manufacturing compacted irons of claim 43 wherein bent lengths of the charging hopper scraper removing the reduced materials containing fine reduced irons stuck to a slanted surface of the inner wall of the charging hopper, which are bent from both ends of the scraping surface and are connected to the couple of supporting members, are different from each other.

45. The apparatus for manufacturing compacted irons of claim 44 wherein the charging hopper scraper comprises:
a first supporting portion installed on the screw feeder; and
a second supporting portion located under the first supporting portion and installed on the screw feeder,
wherein one bent length connected to the first supporting member is longer than the other bent length connected to the second supporting member.

46. The apparatus for manufacturing compacted irons of claim 33 wherein two or more charging hopper scrapers are installed along a longitudinal direction of each screw feeder.

47. The apparatus for manufacturing compacted irons of claim 46 wherein the two or more charging hopper scrapers are alternately installed on the screw feeder in an opposite direction and wherein the screw feeder is located between the charging hopper scrapers.

48. An apparatus for manufacturing compacted irons comprising:
a charging hopper into which reduced materials containing fine reduced irons are charged;
screw feeders installed inside the charging hopper and making an acute angle with a vertical direction, the screw feeders discharging the reduced materials containing fine reduced irons which enter into the charging hopper;
a couple of rolls separated from each other to form a gap between the rolls, the couple of rolls compacting the reduced materials containing fine reduced irons discharged from the charging hopper by the screw feeders and manufacturing compacted irons;
a roll casing surrounding the couple of rolls; and
roll scrapers installed to be connected between inner sides of the roll casing in a longitudinal direction of the rolls and removing compacted irons stuck to the surface of the rolls, the roll scrapers being separated from the rolls,
wherein each screw feeder is arranged side by side along an axis direction of the couple of rolls and an extension of the center axis of each screw feeder passes through the gap.

49. The apparatus for manufacturing compacted irons of claim 48, wherein the roll scrapers are installed under the rolls.

50. The apparatus for manufacturing compacted irons of claim 49, wherein a first surface of each roll scraper closely adhering to the removed compacted irons makes an acute angle with a second surface of the roll scraper facing a surface of the rolls.

51. The apparatus for manufacturing compacted irons of claim 50, wherein the acute angle is in the range from 30 degrees to 60 degrees.

52. The apparatus for manufacturing compacted irons of claim 48, wherein a separating distance between each roll scraper and a roll is shorter than or equal to a separating distance between the couple of rolls.

53. The apparatus for manufacturing compacted irons of claim 52, wherein the separating distance between the roll scrapers and the rolls is in the range from 2 mm to 4 mm.

54. The apparatus for manufacturing compacted irons of claim 48, wherein each roll scraper comprises a plurality of scraper rolls located corresponding to the couple of rolls.

55. The apparatus for manufacturing compacted irons of claim 54, wherein each scraper roll comprises:
scraping portions located corresponding to the couple of rolls and removing compacted irons; and
a fixing portion supporting the scraping portions.

56. The apparatus for manufacturing compacted irons of claim 55, wherein the scraping portions of the scraper rolls are separated from each other.

57. The apparatus for manufacturing compacted irons of claim 55, wherein a concave portion and a protruding portion are continuously formed on the outer surface of the scraping portions.

58. The apparatus for manufacturing compacted irons of claim 57, wherein a plurality of the concave portions are formed on the surfaces of the rolls and wherein the concave portions of the rolls face the protruding portions of the scraper rolls.

59. The apparatus for manufacturing compacted irons of claim 54, wherein the separating distance between the rolls and the roll scrapers corresponding to the rolls is in the range from 3 mm to 5 mm.

60. The apparatus for manufacturing compacted irons of claim 54, wherein each roll scraper further comprises:
a rotor connected between the inner sides of the roll casing in a longitudinal direction of the rolls; and
a couple of fixing blocks fixing both ends of the rotor,
wherein the plurality of scraper rolls are installed on the rotor.

61. The apparatus for manufacturing compacted irons of claim 60, wherein each roll scraper further comprises:
a bush inserted between each scraper roll and the rotor;
a covering member supporting the scraper rolls and the bushes in order for them not to fall;
a stopper fixing each covering member on the rotor; and
a fixing member fixing each fixing block on the roll casing.

62. An apparatus for manufacturing molten irons comprising:
the apparatus for manufacturing compacted irons of claim 1
a crusher for crushing compacted irons discharged from the apparatus for manufacturing compacted irons; and
a melter-gasifier into which the compacted irons, which are crushed by the crusher, are charged and melted.

63. The apparatus for manufacturing molten irons of claim 62, wherein at least one of the coals selected from the group of lumped coals and coal briquettes are supplied to the melter-gasifier.

* * * * *